United States Patent
Seo et al.

(10) Patent No.: US 9,485,757 B2
(45) Date of Patent: Nov. 1, 2016

(54) METHOD AND APPARATUS FOR TRANSMITTING PERIODIC CHANNEL STATE INFORMATION IN WIRELESS COMMUNICATION SYSTEM

(71) Applicant: LG ELECTRONICS INC., Seoul (KR)

(72) Inventors: Dongyoun Seo, Anyang-si (KR); Joonkui Ahn, Anyang-si (KR); Suckchel Yang, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 81 days.

(21) Appl. No.: 14/376,353

(22) PCT Filed: Feb. 4, 2013

(86) PCT No.: PCT/KR2013/000887
§ 371 (c)(1),
(2) Date: Aug. 1, 2014

(87) PCT Pub. No.: WO2013/115622
PCT Pub. Date: Aug. 8, 2013

(65) Prior Publication Data
US 2015/0043458 A1    Feb. 12, 2015

Related U.S. Application Data

(60) Provisional application No. 61/594,383, filed on Feb. 3, 2012, provisional application No. 61/643,341, filed on May 6, 2012.

(51) Int. Cl.
*H04W 72/04* (2009.01)
*H04L 1/00* (2006.01)
*H04L 5/00* (2006.01)

(52) U.S. Cl.
CPC ........ *H04W 72/0413* (2013.01); *H04L 1/0027* (2013.01); *H04L 5/0055* (2013.01)

(58) Field of Classification Search
CPC ........... H04W 72/0413; H04L 5/0055; H04L 1/0027
See application file for complete search history.

(56) References Cited

U.S. PATENT DOCUMENTS

| 2011/0032839 | A1 | 2/2011 | Chen et al. | |
| 2011/0249643 | A1* | 10/2011 | Barbieri | H04L 1/0026 370/329 |
| 2012/0039252 | A1* | 2/2012 | Damnjanovic | H04L 1/0026 370/328 |
| 2012/0140649 | A1* | 6/2012 | Choudhury | H04W 24/10 370/252 |

FOREIGN PATENT DOCUMENTS

| KR | 10-2011-0069741 | 6/2011 |
| KR | 10-2012-0001273 | 1/2012 |
| WO | 2011/085230 | 7/2011 |
| WO | 2011/130393 | 10/2011 |

OTHER PUBLICATIONS

PCT International Application No. PCT/KR2013/000887, Written Opinion of the International Searching Authority dated May 15, 2013, 1 page.

* cited by examiner

*Primary Examiner* — Christopher Grey
(74) *Attorney, Agent, or Firm* — Lee, Hong, Degerman, Kang & Walmey; Jonathan Kang; Michael Monaco

(57) ABSTRACT

Provided are a method for transmitting uplink control information by a user equipment in a wireless communication system, and a user equipment using the method. In the method, a setting of subframes for transmitting each of multiple types of periodic channel state information (CSI) is received, and the multiple types of the periodic CSI from the subframes are transmitted, wherein when the multiple types of the CSI are set to include a rank indicator (RI) for indicating the number of layers recommended by the user equipment, and the RI and a different periodic CSI excluding the RI are set to be transmitted from the same subframe, the RI and the different periodic CSI are multiplexed to the same subframe and then transmitted.

6 Claims, 18 Drawing Sheets

METHOD AND APPARATUS FOR TRANSMITTING PERIODIC CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/000887, filed on Feb. 4, 2013, which claims the benefit of U.S. Provisional Application Ser. No. 61/594,383, filed on Feb. 3, 2012 and 61/643,341, filed on May 6, 2012, the contents of which are all hereby incorporated by reference herein in their entirety.

BACKGROUND OF THE INVENTION

1. Field of the Invention

The present invention relates to wireless communications, and more particularly, to a method and apparatus for transmitting periodic channel state information in a wireless communication system.

2. Related Art

In order to maximize efficiency of limited radio resources, an effective transmission and reception scheme and methods of utilization thereof have been proposed in a wideband wireless communication system. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading. As a result, complexity is decreased in a receiving end and an interval of a transmitted symbol is increased, thereby minimizing the ISI.

In a system using the OFDM as a modulation scheme, orthogonal frequency division multiple access (OFDMA) is a multiple access scheme in which multiple access is achieved by independently providing a part of available subcarrier to each user. In the OFDMA, frequency resources (i.e., subcarriers) are provided to respective users, and the respective frequency resources do not overlap with one another in general since they are independently provided to the multiple users. Consequently, the frequency resources are allocated to the respective users in a mutually exclusive manner. In an OFDMA system, frequency diversity for the multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

A multiple-input multiple-output (MIMO) technique uses multiple transmit antennas and multiple receive antennas to improve data transmission/reception efficiency. Exemplary methods for implementing diversity in a MIMO system include space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc. A MIMO channel matrix depending on the number of receive antennas and the number of transmit antennas can be decomposed into a plurality of independent channels. Each independent channel is referred to as a layer or a stream. The number of layers is referred to as a rank.

Channel state information (CSI) may be transmitted through an uplink control channel (e.g., physical uplink control channel (PUCCH)). The CSI may include various types of information such as a channel quality indicator (CQI), a precoding matrix indicator (PMI), a rank indicator (RI), etc. The PUCCH carries various types of control information according to a format.

A carrier aggregation system has recently drawn attention. The carrier aggregation system implies a system that configures a wideband by aggregating one or more carriers having a bandwidth smaller than that of a target wideband when the wireless communication system intends to support the wideband.

There is a need for a method of transmitting various types of periodic channel state information, especially, multiple channel state information for a plurality of cells, in a carrier aggregation system. In particular, according to the conventional technique, if it is configured that different types of periodic CSI are transmitted in the same subframe, only a CSI having a high priority is transmitted or only a CSI for one of a plurality of cells is transmitted. Therefore, a periodic CSI feedback has a problem in its completeness.

SUMMARY OF THE INVENTION

The present invention provides a method and apparatus for transmitting periodic channel state information in a wireless communication system.

According to an aspect of the present invention, there is provided a method of transmitting uplink control information (UCI), performed by a user equipment, in a wireless communication system. The method includes: configuring subframes for respectively transmitting a plurality of types of channel state information (CSI); and transmitting the plurality of types of periodic CSI in the subframes, wherein the plurality of types of periodic CSI include a rank indicator (RI) indicating the number of layers recommended by the user equipment, and wherein if the RI and a different periodic CSI other than the RI are configured to be transmitted in the same subframe, the RI and the different periodic CSI are transmitted by multiplexing in the same subframe.

According to another aspect of the present invention, there is provided a user equipment including: a radio frequency (RF) unit for transmitting or receiving a radio signal; and a processor operatively coupled to the RF unit, wherein the processor performs operations of: configuring subframes for respectively transmitting a plurality of types of CSI; and transmitting the plurality of types of periodic CSI in the subframes, wherein the plurality of types of periodic CSI include an RI indicating the number of layers recommended by the user equipment, and wherein if the RI and a different periodic CSI other than the RI are configured to be transmitted in the same subframe, the RI and the different periodic CSI are transmitted by multiplexing in the same subframe.

According to the present invention, multiple CSIs for a plurality of cells are multiplexed and transmitted in the same subframe, thereby being able to avoid a system efficiency deterioration when CSI transmission drops.

DESCRIPTION OF EXEMPLARY EMBODIMENTS

Figure 1:
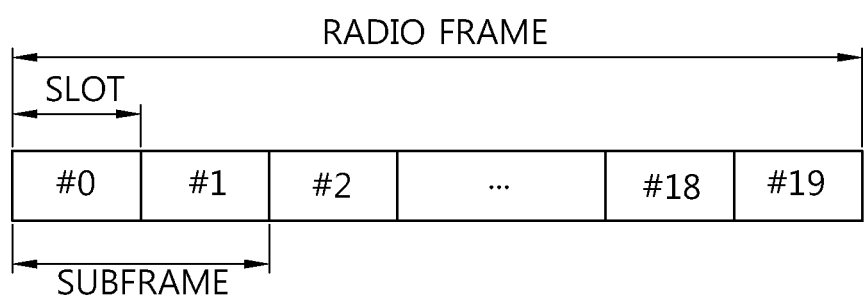
FIG. 1 shows a structure of a radio frame in $3^{rd}$ generation partnership project (3GPP) long term evolution (LTE).

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with an IEEE 802.16e-based system. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is evolved from the 3GPP LTE. Although the following description focuses on LTE/LTE-A for clarity, the technical features of the present invention are not limited thereto.

A wireless communication system includes at least one base station (BS). Each BS provides a communication service to a specific geographical region. A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc. The BS is generally a fixed station that communicates with the UE and may be referred to as another terminology, such as an evolved Node-B (eNB), a base transceiver system (BTS), an access point, etc.

The UE belongs to one cell in general. A cell to which the UE belongs is called a serving cell. A BS which provides a communication service to the serving cell is called a serving BS. The serving BS may provide one or a plurality of serving cells.

This technique can be used in a downlink or an uplink. In general, the downlink implies communication from the BS to the UE, and the uplink implies communication from the UE to the BS.

Layers of a radio interface protocol between the UE and the BS can be classified into a first layer (L1), a second layer (L2), and a third layer (L3) based on the lower three layers of the open system interconnection (OSI) model that is well-known in the communication system.

A physical layer, i.e., the first layer, is connected to a medium access control (MAC) layer, i.e., a higher layer, through a transport channel. Data between the MAC and physical layers is transferred through the transport channel. Further, between different physical layers, i.e., between a physical layer of a transmitting side and a physical layer of a receiving side, data is transferred through a physical channel.

A radio data link layer, i.e., the second layer, consists of a MAC layer, an RLC layer, and a PDCP layer. The MAC layer is a layer that manages mapping between a logical channel and the transport channel. The MAC layer selects a proper transport channel to transmit data delivered from the RLC layer, and adds essential control information to a header of a MAC protocol data unit (PDU).

The RLC layer is located above the MAC layer and supports reliable data transmission. In addition, the RLC layer segments and concatenates RLC service data units (SDUs) delivered from an upper layer to configure data having a suitable size for a radio section. The RLC layer of a receiver supports a reassemble function of data to restore an original RLC SDU from the received RLC PDUs.

The PDCP layer is used only in a packet exchange area, and can perform transmission by compressing a header of an IP packet to increase transmission efficiency of packet data in a radio channel.

The RRC layer, i.e., the third layer, exchanges radio resource control information between the UE and the network in addition to controlling of a lower layer. According to a communication state of the UE, various RRC states (e.g., an idle mode, an RRC connected mode, etc.) are defined, and transition between the RRC states is optionally possible. In the RRC layer, various procedures related to radio resource management are defined such as system information broadcasting, an RRC access management procedure, a multiple component carrier setup procedure, a radio bearer control procedure, a security procedure, a measurement procedure, a mobility management procedure (handover), etc.

The wireless communication system may be any one of a multiple-input multiple-output (MIMO) system, a multiple-input single-output (MISO) system, a single-input single-output (SISO) system, or a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and a plurality of receive antennas. Hereinafter, a transmit antenna implies a physical or logical antenna used to transmit one signal or stream, and a receive antenna implies a physical or logical antenna used to receive one signal or stream.

FIG. 1 shows a structure of a radio frame in 3GPP LTE.

The section 5 of 3GPP (3rd Generation Partnership Project) TS 36.211 V8.2.0 (2008 March) "Technical Specification Group Radio Access Network; Evolved Universal Terrestrial Radio Access (E-UTRA); Physical channels and modulation (Release 8)" can be incorporated herein by reference. Referring to FIG. 1, the radio frame consists of 10 subframes. One subframe consists of two slots. Slots included in the radio frame are numbered with slot numbers #0 to #19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One slot includes a plurality of orthogonal frequency division multiplexing (OFDM) symbols in a time domain, and includes a plurality of subcarriers in a frequency domain. Since the 3GPP LTE uses OFDMA in downlink transmission, the OFDM symbol is for representing one symbol period, and can be referred to as other terms. For example, the OFDM symbol can also be referred to as an SC-FDMA symbol when SC-FDMA is used as an uplink multiple-access scheme. A resource block (RB) is a resource allocation unit, and includes a plurality of consecutive subcarriers in one slot. The above radio frame structure is shown for exemplary purposes only. Thus, the number of subframes included in the radio frame, the number of slots included in the subframe, or the number of OFDM symbols included in the slot may change variously.

In 3GPP LTE, it is defined such that one slot includes 7 OFDM symbols in a normal cyclic prefix (CP) and one slot includes 6 OFDM symbols in an extended CP.

A wireless communication system can be briefly classified into a system based on a frequency division duplex (FDD) scheme and a system based on a time division duplex (TDD) scheme. In the FDD scheme, uplink transmission and downlink transmission are achieved while occupying different frequency bands. In the TDD scheme, uplink transmission and downlink transmission are achieved at different times while occupying the same frequency band. A channel response based on the TDD scheme is reciprocal in practice. This implies that a downlink channel response is almost identical to an uplink channel response in a given frequency domain. Therefore, in a TDD-based wireless communication system, the downlink channel response can be advantageously obtained from the uplink channel response. In the TDD scheme, a full frequency band is time-divided into uplink transmission and downlink transmission, and thus downlink transmission performed by a BS and uplink transmission performed by a UE can be simultaneously achieved. In a TDD system in which uplink transmission and downlink transmission are divided on a subframe basis, uplink transmission and downlink transmission are performed in different subframes. In the TDD scheme, an uplink subframe and a downlink subframe coexist in one frame, and a configuration thereof is determined by an uplink-downlink (UL-DL) configuration. Regarding the UL-DL configuration, Table 4.2.2. of 3GPP TS 36.211 V10.0.0 may be incorporated by reference.

Figure 2:
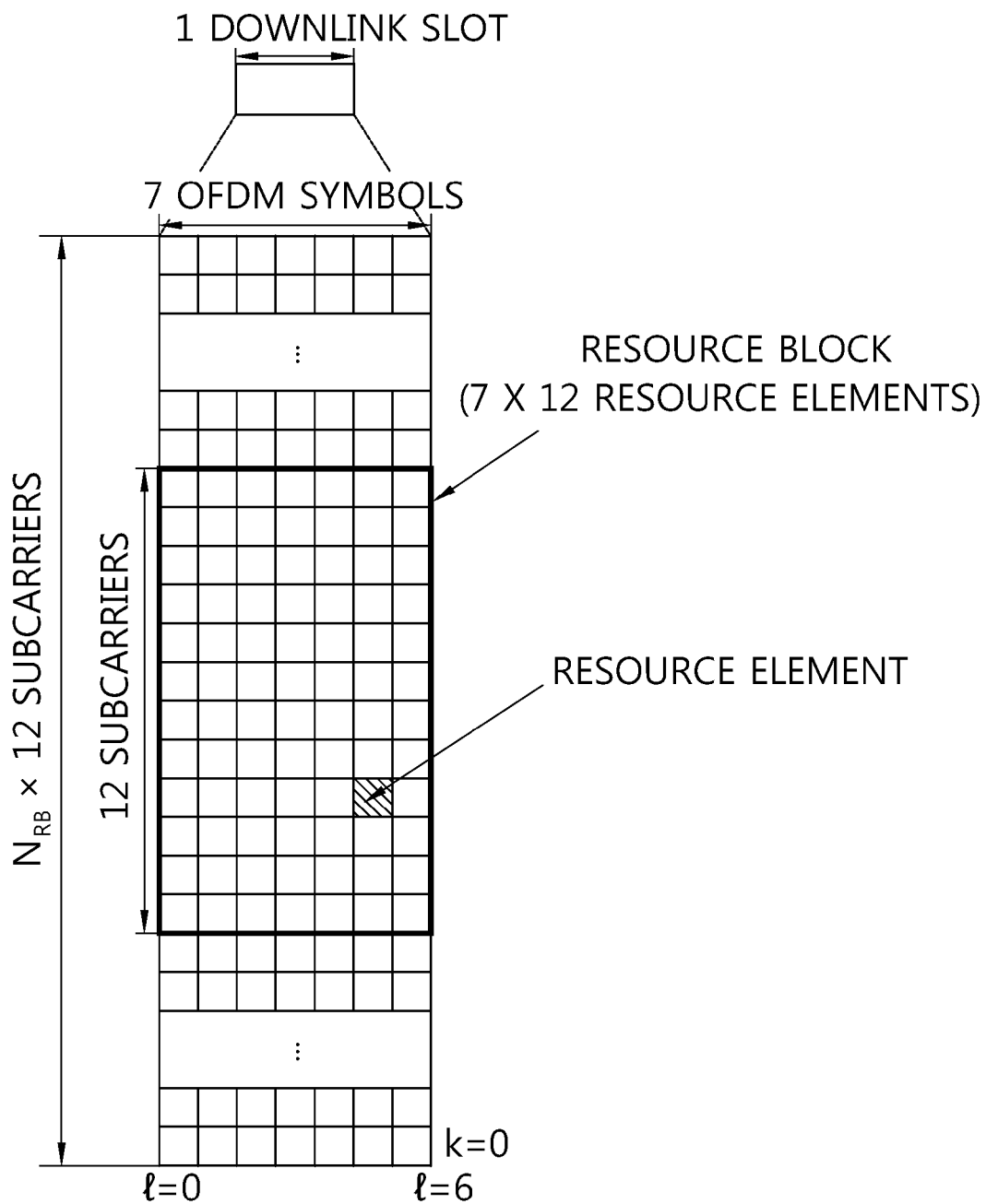
FIG. 2 shows an example of a resource grid for one downlink slot.

FIG. 2 shows an example of a resource grid for one downlink slot.

The downlink slot includes a plurality of OFDM symbols in a time domain, and includes $N_{RB}$ resource blocks (RBs) in a frequency domain. The number $N_{RB}$ of RBs included in the downlink slot depends on a downlink transmission bandwidth configured in a cell. For example, in the LTE system, $N_{RB}$ may be any one value in the range of 6 to 110. One RB includes a plurality of subcarriers in a frequency domain. A structure of an uplink slot may be the same as the aforementioned structure of the downlink slot.

Each element on the resource grid is referred to as a resource element (RE). The RE on the resource grid can be identified by an index pair (k,l) within the slot. Herein, k (k=0, . . . , $N_{RB} \times 12-1$) denotes a subcarrier index in the frequency domain, and l (l=0, . . . , 6) denotes an OFDM symbol index in the time domain.

Although it is described herein that one RB consists of 7 OFDM symbols in the time domain and 12 subcarriers in the frequency domain and thus includes 7×12 REs, this is for exemplary purposes only. Therefore, the number of OFDM symbols and the number of subcarriers in the RB are not limited thereto. The number of OFDM symbols and the number of subcarriers may change variously depending on a CP length, a frequency spacing, etc. For example, the number of OFDM symbols is 7 in a normal CP case, and the number of OFDM symbols is 6 in an extended CP case. The number of subcarriers in one OFDM symbol may be selected from 128, 256, 512, 1024, 1536, and 2048.

Figure 3:
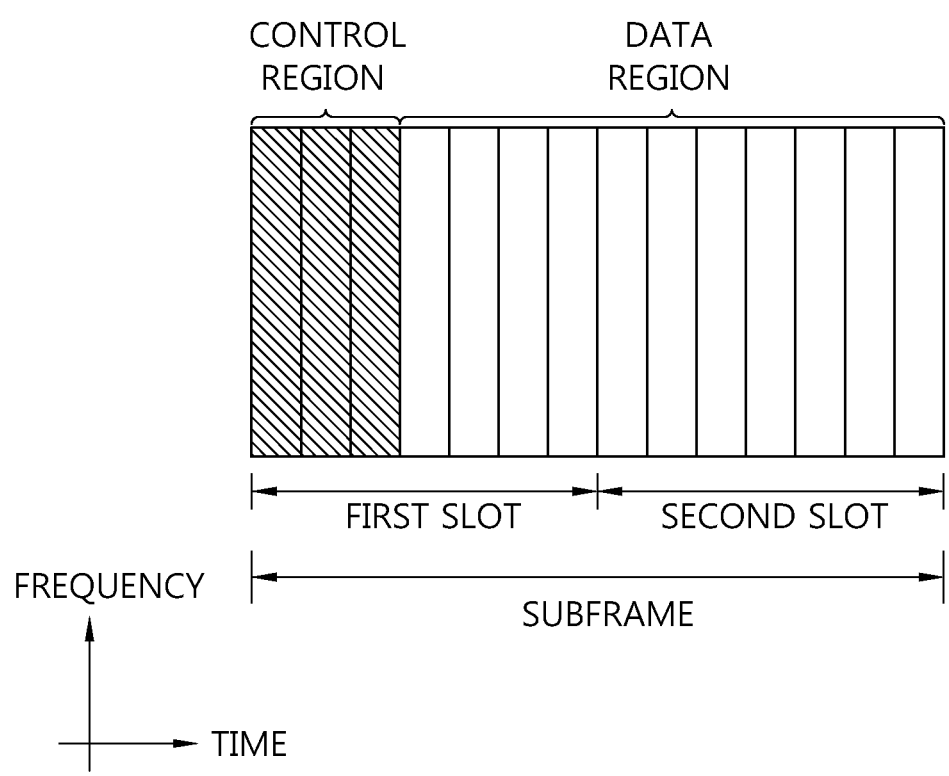
FIG. 3 shows a structure of a downlink subframe.

FIG. 3 shows a structure of a downlink subframe.

The downlink subframe includes two slots in a time domain. Each slot includes 7 OFDM symbols in a normal CP case. Up to three OFDM symbols (i.e., in case of 1.4 MHz bandwidth, up to 4 OFDM symbols) located in a front portion of a first slot within the subframe correspond to a control region, and the remaining OFDM symbols correspond to a data region. Herein, control channels are allocated to the control region, and a physical downlink shared channel (PDSCH) is allocated to the data region.

A physical downlink control channel (PDCCH) can carry a downlink shared channel (DL-SCH)'s resource allocation and transmission format, uplink shared channel (UL-SCH)'s resource allocation information, paging information on a PCH, system information on a DL-SCH, a resource allocation of a higher layer control message such as a random access response transmitted through a PDSCH, a transmission power control command for individual UEs included in any UE group, activation of a voice over Internet (VoIP), etc. A plurality of PDCCHs can be transmitted in the control region, and the UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups. A format of the PDCCH and the number of bits of the available PDCCH are determined according to a correlation between the number of CCEs and the coding rate provided by the CCEs.

A BS determines a PDCCH format according to downlink control information (DCI) to be transmitted to a UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (P-RNTI)) may be masked to the CRC. If the PDCCH is for a system information block (SIB), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
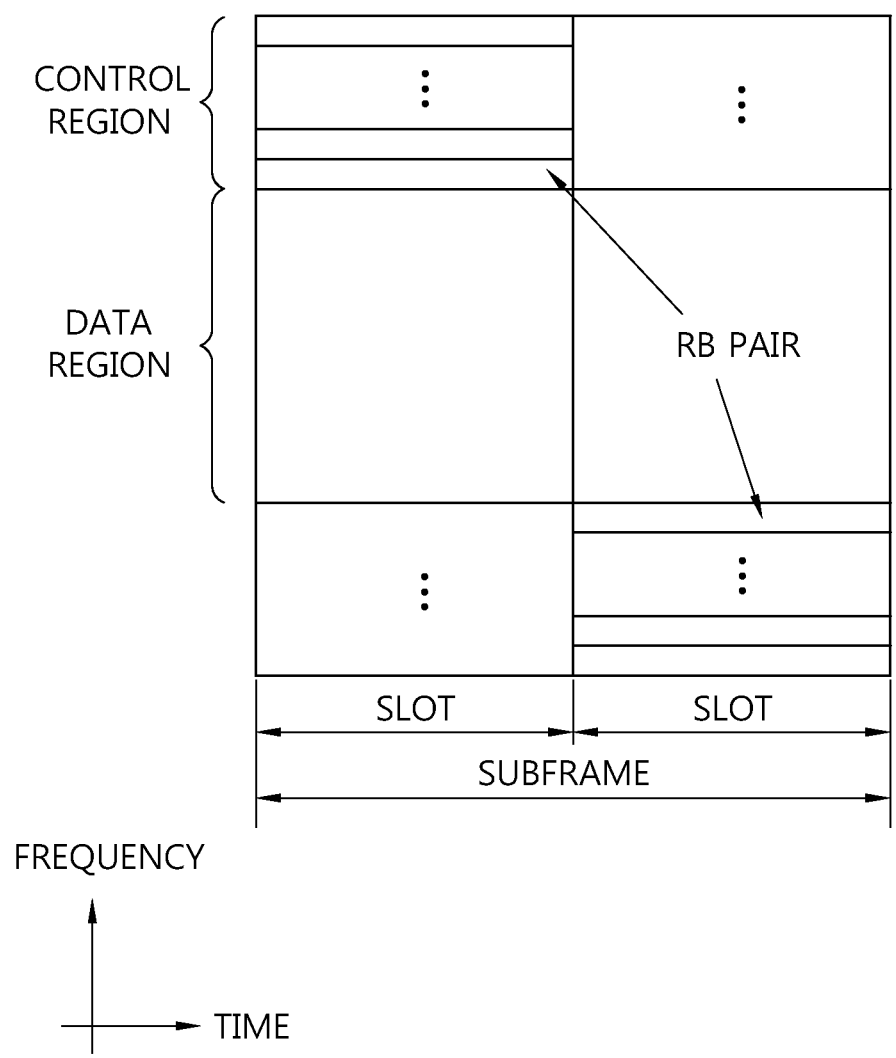
FIG. 4 shows a structure of an uplink subframe.

FIG. 4 shows a structure of an uplink subframe.

The uplink subframe can be divided into a control region and a data region. A physical uplink control channel (PUCCH) for carrying uplink control information (UCI) is allocated to the control region. A physical uplink shared channel (PUSCH) for carrying data is allocated to the data region.

When indicated by a higher layer, a UE may support simultaneous transmission of the PUSCH and the PUCCH.

The PUCCH for one UE is allocated in an RB pair in a subframe. RBs belonging to the RB pair occupy different subcarriers in each of a first slot and a second slot. That is, a frequency occupied by the RBs belonging to the RB pair to which the PUCCH is allocated changes at a slot boundary. This is called that the RB pair allocated to the PUCCH is frequency-hopped at the slot boundary. Since the UE transmits the UCI on a time basis through different subcarriers, a frequency diversity gain can be obtained.

The PUSCH is a channel mapped to an uplink shared channel (UL-SCH) which is a transport channel. Uplink data transmitted through the PUSCH may be a transport block which is a data block for the UL-SCH transmitted during a TTI. The transport block may include user information. In addition, the uplink data may be multiplexed data. The multiplexed data may be obtained by multiplexing the UCI and a transport block for the UL-SCH. Examples of the UCI to be multiplexed with data may include a channel quality indicator (CQI), a precoding matrix indicator (PMI), hybrid automatic repeat request acknowledgement/not-acknowledgement (HARQ-ACK/NACK, also referred to as HARQ-ACK or A/N), a rank indicator (RI), etc.

Alternatively, the uplink data may consist of only the UCI.

Meanwhile, a wireless communication system may support a carrier aggregation (CA). Herein, the CA is when a wideband is configured by aggregating one or more carriers having a smaller bandwidth than the wideband. The CA system is a system which configure a wideband by aggregating one or more carriers having a bandwidth smaller than that of a target wideband when the wireless communication system intends to support the wideband.

Figure 5:
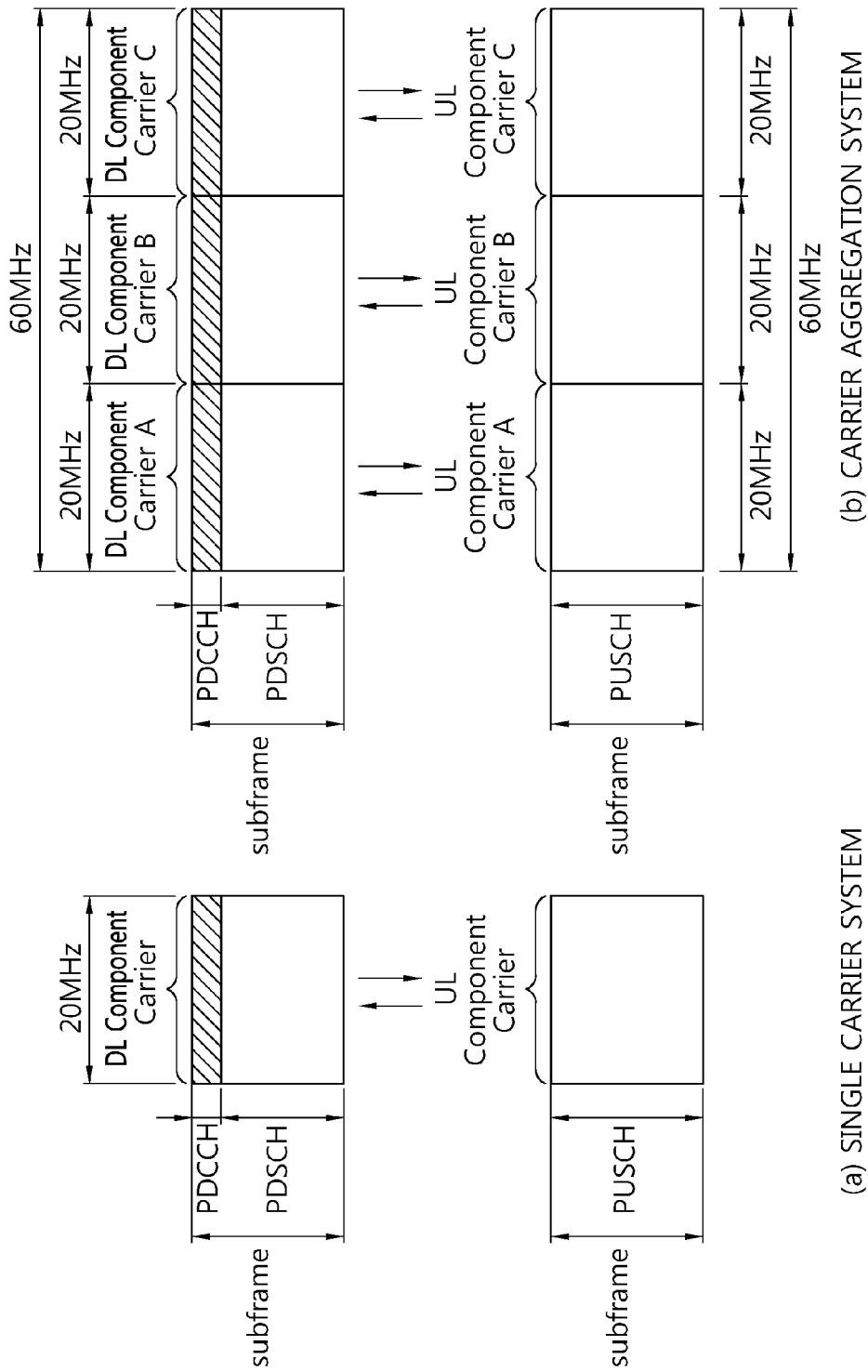
FIG. 5 shows an example of comparing a single-carrier system and a carrier aggregation system.

FIG. 5 shows an example of comparing a single-carrier system and a carrier aggregation system.

Referring to FIG. 5, only one carrier is supported for a UE in an uplink and a downlink in the single-carrier system. Although the carrier may have various bandwidths, only one carrier is assigned to the UE. Meanwhile, multiple component carriers (CCs) can be assigned to the UE in the carrier aggregation system. For example, three 20 MHz CCs can be assigned to allocate a 60 MHz bandwidth to the UE. The CC includes a downlink (DL) CC and an uplink (UL) CC.

The carrier aggregation system can be divided into a contiguous carrier aggregation system in which carriers are contiguous to each other and a non-contiguous carrier aggregation system in which carriers are separated from each other. Hereinafter, when it is simply called the carrier aggregation system, it should be interpreted such that both cases of contiguous CCs and non-contiguous CCs are included.

A CC which is a target when aggregating one or more CCs may directly use a bandwidth that is used in the legacy system in order to provide backward compatibility with the legacy system. For example, a 3GPP LTE system may support a carrier having a bandwidth of 1.4 MHz, 3 MHz, 5 MHz, 10 MHz, 15 MHz, and 20 MHz, and a 3GPP LTE-A system may configure a wideband of 20 MHz or higher by using each carrier of the 3GPP LTE system as a CC. Alternatively, the wideband may be configured by defining a new bandwidth without having to directly use the bandwidth of the legacy system.

A frequency band of a wireless communication system is divided into a plurality of carrier frequencies. Herein, the carrier frequency implies a center frequency of a cell. Hereinafter, the cell may imply a downlink frequency resource and an uplink frequency resource. Alternatively, the cell may also imply combination of a downlink frequency resource and an optional uplink frequency resource. In general, if a carrier aggregation (CA) is not considered, uplink and downlink frequency resources may always exist in pair in one cell.

In order to transmit and receive packet data through a specific cell, the UE first has to complete a configuration of the specific cell. Herein, the configuration implies a state of completely receiving system information required for data transmission and reception for the cell. For example, the configuration may include an overall procedure that requires common physical layer parameters necessary for data transmission and reception, media access control (MAC) layer parameters, or parameters necessary for a specific operation in a radio resource control (RRC) layer. A cell of which configuration is complete is in a state capable of immediately transmitting and receiving a packet upon receiving only information indicating that packet data can be transmitted.

The cell in a state of completing its configuration may exist in an activation or deactivation state. Herein, the activation implies that data transmission or reception is performed or is in a ready state. The UE may monitor or receive a control channel (i.e., PDCCH) and a data channel (i.e., PDSCH) of an activated cell in order to confirm a resource (e.g., frequency, time, etc.) allocated to the UE.

The deactivation implies that transmission or reception of traffic data is impossible and measurement or transmission/reception of minimum information is possible. The UE may receive system information (SI) required for packet reception from a deactivated cell. On the other hand, the UE does not monitor or receive a control channel (i.e., PDCCH) and a data channel (i.e., PDSCH) of the deactivated cell in order to confirm a resource (e.g., frequency, time, etc.) allocated to the UE.

A cell can be classified into a primary cell, a secondary cell, a serving cell, etc.

The primary cell implies a cell which operates at a primary frequency, and also implies a cell which performs an initial connection establishment procedure or a connection re-establishment procedure or a cell indicated as the primary cell in a handover procedure.

The secondary cell implies a cell which operates at a secondary frequency, and is configured when an RRC connection is once established and is used to provide an additional radio resource.

The serving cell is configured with the primary cell in case of a UE of which a CA is not configured or which cannot provide the CA. If the CA is configured, the term 'serving cell' is used to indicate a set consisting of a primary cell and one or a plurality of cells among all secondary cells.

That is, the primary cell implies one serving cell that provides a security input and NAS mobility information in an RRC establishment or re-establishment state. According to UE capabilities, it can be configured such that at least one cell constitutes a serving cell set together with the primary cell, and in this case, the at least one cell is called the secondary cell.

Therefore, a set of serving cells assigned to only one UE may consist of only one primary cell, or may consist of one primary cell and at least one secondary cell.

A primary component carrier (PCC) implies a CC corresponding to a primary cell. The PCC is a CC that establishes an initial connection (or RRC connection) with the BS among several CCs. The PCC serves for connection (or RRC connection) for signaling related to a plurality of CCs, and is a CC that manages UE context which is connection information related to the UE. In addition, the PCC establishes connection with the UE, and thus always exists in an activation state when in an RRC connected mode.

A secondary component carrier (SCC) implies a CC corresponding to a secondary cell. That is, the SCC is a CC allocated to the UE in addition to the PCC. The SCC is an extended carrier used by the UE for additional resource allocation or the like in addition to the PCC, and may be divided into an activation state and a deactivation state.

A DL CC corresponding to the primary cell is called a downlink primary component carrier (DL PCC), and a UL CC corresponding to the primary cell is called an uplink primary component carrier (UL PCC). In addition, in a downlink, a CC corresponding to the secondary cell is called a DL secondary CC (SCC). In an uplink, a CC corresponding to the secondary cell is called a UL SCC.

The primary cell and the secondary cell have the following features.

First, the primary cell is used for PUCCH transmission.

Second, the primary cell is always activated, whereas the secondary cell is a cell which is activated/deactivated according to a specific condition.

Third, when the primary cell experiences a radio link failure (RLF), RRC re-establishment is triggered, whereas when the secondary cell experiences the RLF, the RRC re-establishment is not triggered.

Fourth, the primary cell may change by a handover procedure accompanied by a random access channel (RACH) procedure or security key modification.

Fifth, non-access stratum (NAS) information is received through the primary cell.

Sixth, the primary cell always consists of a pair of a DL PCC and a UL PCC.

Seventh, for each UE, a different CC may be configured as the primary cell.

Eighth, a procedure such as reconfiguration, adding, and removal of the primary cell may be performed by an RRC layer. When adding a new secondary cell, RRC signaling may be used for transmission of system information of a dedicated secondary cell.

A DL CC may construct one serving cell. Further, the DL CC may be connected to a UL CC to construct one serving cell. However, the serving cell is not constructed only with one UL CC.

Activation/deactivation of a CC is equivalent to the concept of activation/deactivation of a serving cell. For example, if it is assumed that a serving cell 1 consists of a DL CC 1, activation of the serving cell 1 implies activation of the DL CC 1. If it is assumed that a serving cell 2 is configured by connecting a DL CC 2 and a UL CC 2, activation of the serving cell 2 implies activation of the DL CC 2 and the UL CC 2. In this sense, each CC may correspond to a cell.

The number of CCs aggregated between a downlink and an uplink may be determined differently. Symmetric aggregation is when the number of DL CCs is equal to the number of UL CCs. Asymmetric aggregation is when the number of DL CCs is different from the number of UL CCs. In addition, the CCs may have different sizes (i.e., bandwidths). For example, if 5 CCs are used to configure a 70 MHz band, it can be configured such as 5 MHz CC(carrier #0)+20 MHz CC(carrier #1)+20 MHz CC(carrier #2)+20 MHz CC(carrier #3)+5 MHz CC(carrier #4).

As described above, the carrier aggregation system may support multiple CCs unlike a single-carrier system. That is, one UE may receive a plurality of PDSCHs through a plurality of DL CCs. In addition, the UE may transmit ACK/NACK for the plurality of PDSCHs through one UL CC, e.g., UL PCC. That is, in the conventional single carrier system, since only one PDSCH is received in one subframe, it is enough to transmit up to two pieces of HARQ ACK/NACK (hereinafter, simply called ACK/NACK) information. However, in the carrier aggregation system, since ACK/NACK for a plurality of PDSCHs may be transmitted through one UL CC, there is a need for a method of transmitting the ACK/NACK.

The UE may monitor the PDCCH in a plurality of DL CCs, and may receive a DL transport block simultaneously via the plurality of DL CCs. The UE may transmit a plurality of UL transport blocks simultaneously via a plurality of UL CCs.

Two CC scheduling methods are possible in the multiple-carrier system.

First, a PDCCH-PDSCH pair is transmitted in one CC. This CC is called self-scheduling. In addition, this implies that a UL CC in which a PUSCH is transmitted is a CC linked to a DL CC in which a corresponding PDCCH is transmitted. That is, the PDCCH allocates a PDSCH resource on the same CC, or allocates a PUSCH resource on a linked UL CC.

Second, a DL CC in which the PDSCH is transmitted or a UL CC in which the PUSCH is transmitted is determined irrespective of a DL CC in which the PDCCH is transmitted. That is, the PDCCH and the PDSCH are transmitted in different DL CCs, or the PUSCH is transmitted through a UL CC which is not linked to the DL CC in which the PDSCH is transmitted. This is called cross-carrier scheduling. A CC in which the PDCCH is transmitted is called a PDCCH carrier, a monitoring carrier, or a scheduling carrier. A CC in which the PDSCH/PUSCH is transmitted is called a PDSCH/PUSCH carrier or a scheduled carrier.

Now, the conventional PUCCH format will be described.

The PUCCH carries various types of control information according to a format. A PUCCH format 1 carries a scheduling request (SR). In this case, an on-off keying (OOK) scheme may be applied. A PUCCH format 1a carries an ACK/NACK modulated using bit phase shift keying (BPSK) with respect to one codeword. A PUCCH format 1b carries an ACK/NACK modulated using quadrature phase shift keying (QPSK) with respect to two codewords. A PUCCH format 2 carries a channel quality indicator (CQI) modulated using QPSK. PUCCH formats 2a and 2b carry the CQI and the ACK/NACK.

The PUCCH format can be classified according to a modulation scheme and the number of bits in a subframe. Table 1 shows a modulation scheme and the number of bits in a subframe according to a PUCCH format.

TABLE 1

| PUCCH format | Modulation scheme | Number of bits per subframe. $M_{bit}$ |
| --- | --- | --- |
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

Figure 6:
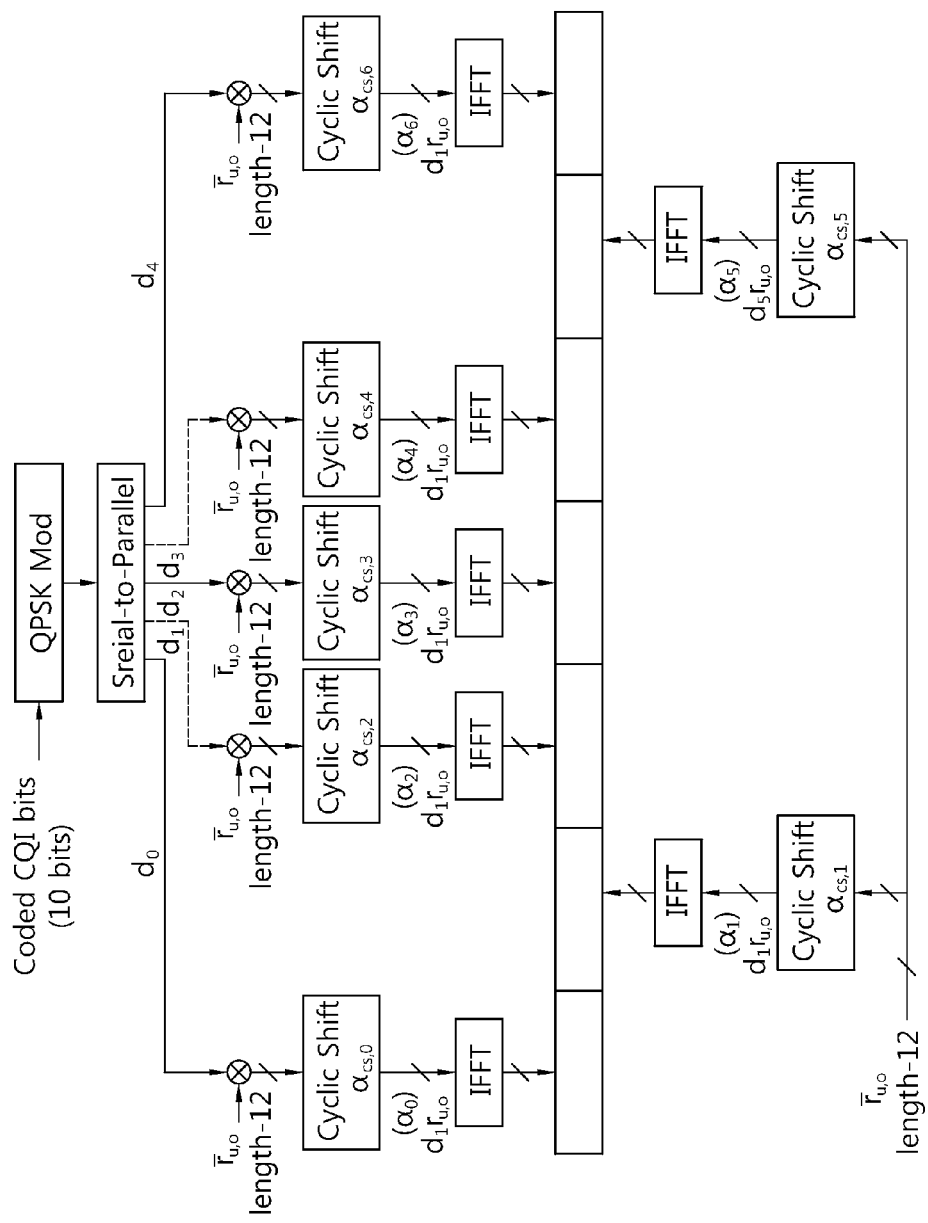
FIG. 6 shows a channel structure of a physical uplink control channel (PUCCH) format 2/2a/2b for one slot in a normal cyclic prefix (CP) case.

FIG. 6 shows a channel structure of a PUCCH format 2/2a/2b for one slot in a normal CP case. As described above, the PUCCH format 2/2a/2b is used in CQI transmission.

Referring to FIG. 6, in the normal CP case, SC-FDMA symbols 1 and 5 are used for a demodulation reference signal (DM RS) which is an uplink reference signal. In an extended CP case, an SC-FDMA symbol 3 is used for the DM RS.

10 CQI information bits are channel coded, for example, with a coding rate of ½, to generate 20 coded bits. A Reed-Muller code may be used in the channel coding. After scheduling, QPSK constellation mapping is performed to generate QPSK modulation symbols (e.g., $d_0$ to $d_4$ in a slot 0). Each QPSK modulation symbol is subjected to IFFT after being modulated by using a cyclic shift of a base RS sequence having a length of 12, and is then transmitted in each of 10 SC-FDMA symbols in a subframe. 12 equally-spaced cyclic shifts allow 12 different UEs to be orthogonally multiplexed on the same PUCCH RB. A DM RS sequence applied to the SC-FDMA symbols 1 and 5 may be the base RS sequence having a length of 12.

Figure 7:
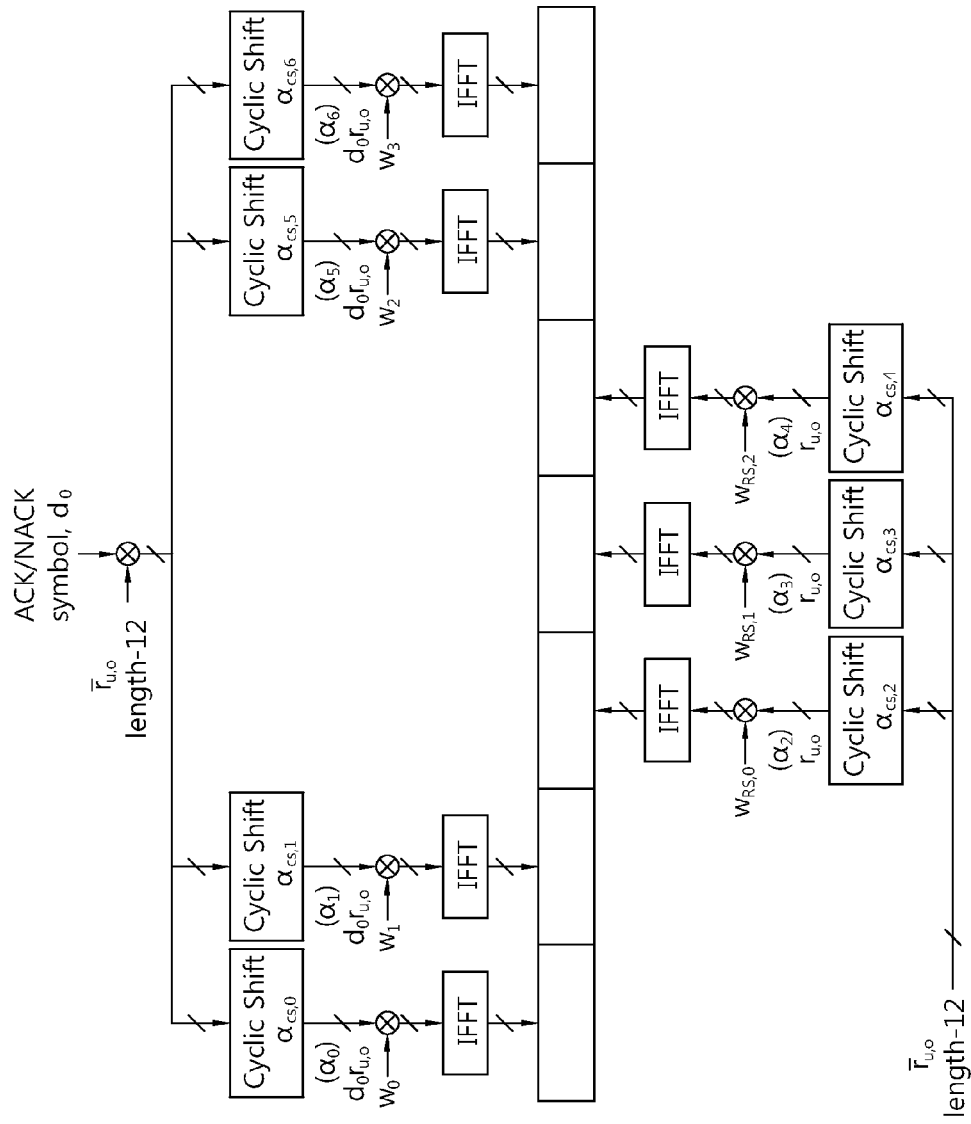
FIG. 7 shows a PUCCH format 1a/1b for one slot in a normal CP case.

FIG. 7 shows a PUCCH format 1a/1b for one slot in a normal CP case. Uplink reference signals are transmitted in $3^{rd}$ to $5^{th}$ SC-FDMA symbols. In FIG. 7, $w_0$, $w_1$, $w_2$ and $w_3$ may be modulated in a time domain after inverse fast Fourier transform (IFFT) modulation, or may be modulated in a frequency domain before IFFT modulation.

In LTE, simultaneous transmission of ACK/NACK and CQI in the same subframe may be enabled or disabled. The ACK/NACK in this case is ACK/NACK for a single cell. In a case where simultaneous transmission of the ACK/NACK and the CQI is disabled, a UE may need to transmit the ACK/NACK on a PUCCH of a subframe in which CQI feedback is configured. In this case, the CQI is dropped, and only the ACK/NACK is transmitted using the PUCCH format 1a/1b.

Simultaneous transmission of the ACK/NACK and the CQI in the same subframe may be achieved through UE-specific higher layer signaling. For example, whether the ACK/NACK and the CQI can be transmitted simultaneously in the same subframe may be configured by using a parameter 'simultaneousAckNackAndCQI' included in a radio resource control (RRC) message. That is, if 'simultaneousAckNackAndCQI' is set to TRUE, the simultaneous transmission may be enabled, and otherwise, if it is set to FALSE, the simultaneous transmission may be disabled. When simultaneous transmission is enabled, 1-bit or 2-bit ACK/NACK information needs to be multiplexed to the same PUCCH RB in a subframe in which a BS scheduler permits simultaneous transmission of the CQI and the ACK/NACK. In this case, it is necessary to preserve a single-carrier property having a low cubic metric (CM). A method of multiplexing the CQI and the ACK/NACK while preserving the single-carrier property is different between a normal CP case and an extended CP case.

First, when 1-bit or 2-bit ACK/NACK and CQI are transmitted together by using the PUCCH format 2a/2b in the normal CP case, ACK/NACK bits are not scrambled, and are subjected to BPSK (in case of 1 bit)/QPSK (in case of 2 bits) modulation to generate a single HARQ ACK/NACK modulation symbol $d_{HARQ}$. The ACK is encoded as a binary '1', and the NACK is encoded as a binary '0'. The single HARQ ACK/NACK modulation symbol $d_{HARQ}$ is used to modulate a second RS symbol in each slot. That is, the ACK/NACK is signaled by using an RS.

Figure 8:
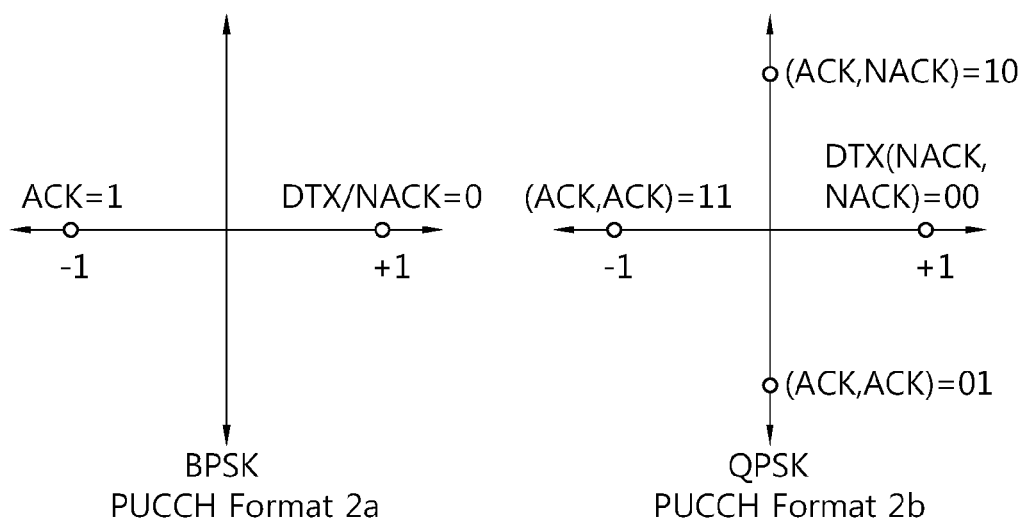
FIG. 8 shows an example of constellation mapping of acknowledgement/non-acknowledgement (ACK/NACK) in a normal CP case and a PUCCH format 2a/2b.

FIG. 8 shows an example of constellation mapping of ACK/NACK in a normal CP case and a PUCCH format 2a/2b.

Referring to FIG. 8, NACK (or NACK/NACK in case of transmission of two downlink codewords) is mapped to +1. In discontinuous transmission (DTX) which implies a case where a UE fails to detect a downlink grant, neither ACK nor NACK is transmitted, and a default NACK is set in this case. The DTX is interpreted as NACK by a BS, and causes downlink retransmission.

Next, 1- or 2-bit ACK/NACK is joint-coded with CQI in an extended CP case in which one RS symbol is used per slot.

Figure 9:
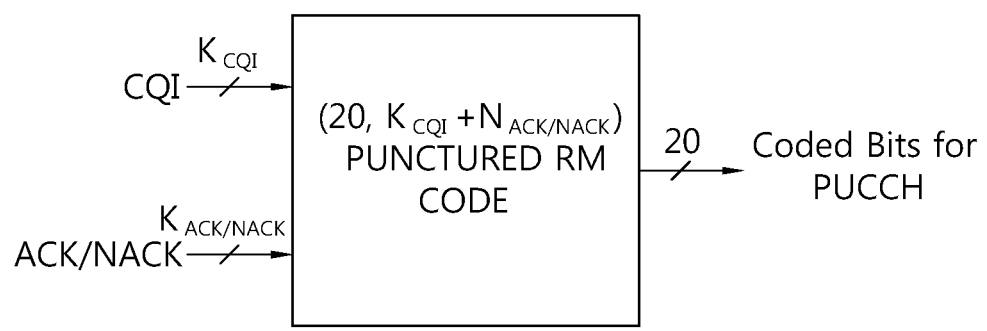
FIG. 9 shows an example of joint coding between ACK/NACK and a channel quality indicator (CQI) in an extended CP case.

FIG. 9 shows an example of joint coding between ACK/NACK and a CQI in an extended CP case.

Referring to FIG. 9, a maximum number of bits of an information bit supported by an RM code may be 13. In this case, a CQI information bit $K_{eqi}$ may be 11 bits, and an ACK/NACK bit $K_{ACK/NACK}$ may be 2 bits. The CQI information bit and the ACK/NACK information bit are concatenated to generate a bit stream and thereafter may be subjected to channel coding by the RM code. In this case, it is expressed such that the CQI information bit and the ACK/NACK information bit are joint-coded. That is, the CQI information bit and the ACK/NACK information bit are joint-coded by the RM code into 20-bit coded bits. The 20-bit codeword generated in this process is transmitted through a PUCCH format 2 having the channel structure described in FIG. 6 (in an extended CP case, one RS symbol is used per slot unlike in FIG. 6).

In LTE, ACK/NACK and an SR may be multiplexed and thus be simultaneously transmitted by using the PUCCH format 1a/1b.

Figure 10:
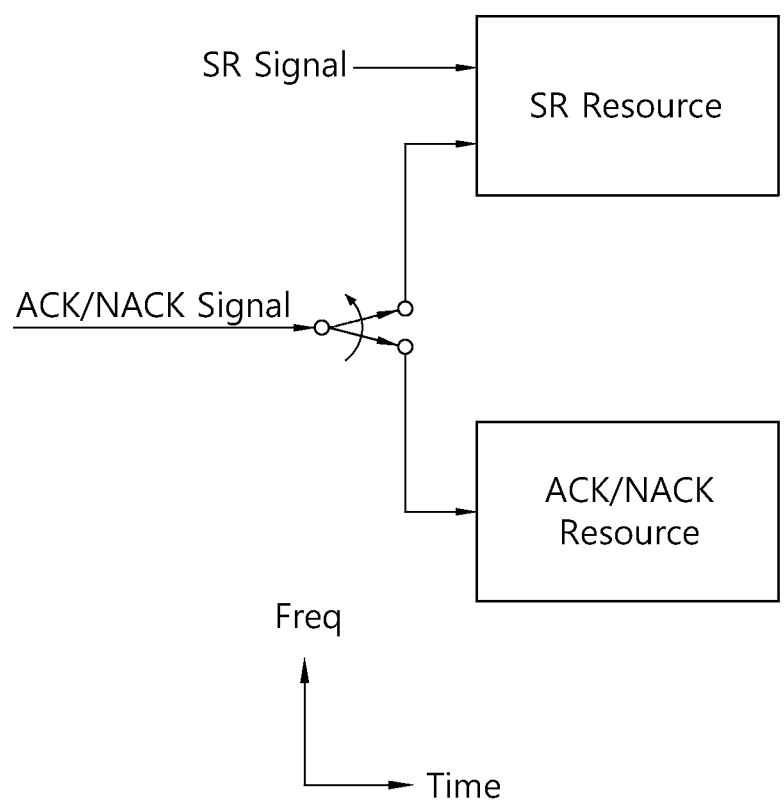
FIG. 10 shows a method of multiplexing ACK/NACK and a scheduling request (SR).

FIG. 10 shows a method of multiplexing ACK/NACK and an SR.

Referring to FIG. 10, when the ACK/NACK and the SR are transmitted simultaneously in the same subframe, a UE transmits the ACK/NACK by using an allocated SR resource. In this case, the SR is a positive SR. If the positive SR is received, a BS may know that scheduling is requested by the UE. In addition, the UE may transmit ACK/NACK by using an allocated ACK/NACK resource. In this case, the SR implies a negative SR. That is, according to which resource is used to transmit ACK/NACK in a subframe in which the ACK/NACK and the SR are simultaneously transmitted, a BS can identify not only the ACK/NACK but also whether the SR is a positive SR or a negative SR.

Figure 11:
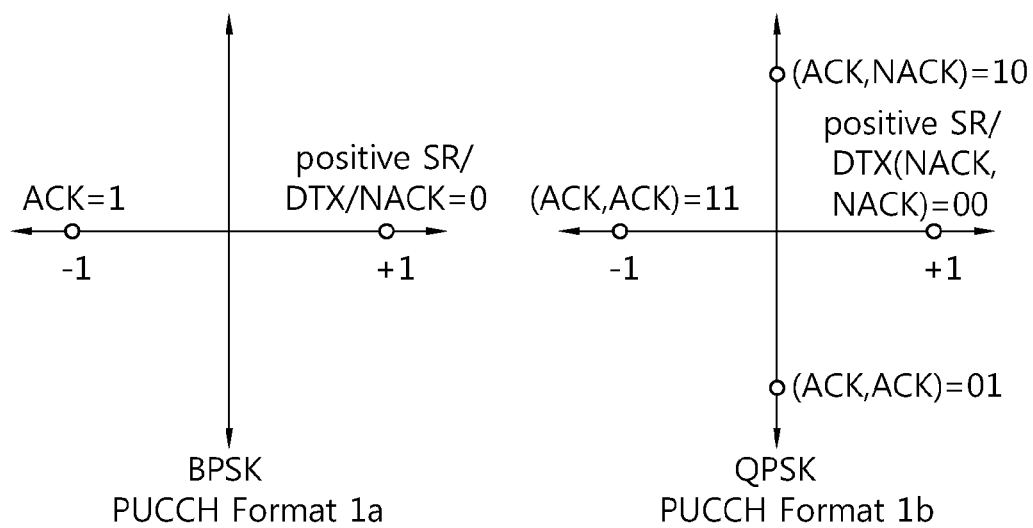
FIG. 11 shows constellation mapping when ACK/NACK and an SR are simultaneously transmitted.

FIG. 11 shows constellation mapping when ACK/NACK and an SR are simultaneously transmitted.

Referring to FIG. 11, DTX/NACK and a positive SR are mapped to +1 of a constellation map, and ACK is mapped to −1. The constellation map may indicate a phase of a signal.

Meanwhile, in the LTE TDD system, a UE may feed back multiple ACK/NACK for multiple PDSCHs to a BS. This is because the UE can receive the multiple PDSCHs in multiple subframes, and can transmit ACK/NACK for the multiple PDSCHs in one subframe. In this case, there are two types of ACK/NACK transmission methods as follows.

The first method is ACK/NACK bundling. The ACK/NACK bundling is a process of combining ACK/NACK bits for multiple data units by using a logical AND operation. For example, if the UE decodes all the multiple data units successfully, the UE transmits only one ACK bit. Otherwise, if the UE fails to decode (or to detect) any one of the multiple data units, the UE may transmit NACK or may transmit no signal as ACK/NACK.

Examples of bundling may include spatial bundling, time-domain bundling, frequency-domain bundling, etc. The spatial bundling is a scheme of compressing A/N for each codeword when a plurality of codewords are received within one PDSCH. The time-domain bundling is a scheme of compressing A/N for data units received in different subframes. The frequency-domain bundling is a scheme of compressing A/N for data units received in different cells (i.e., CCs).

The second method is ACK/NACK multiplexing. With ACK/NACK multiplexing, the content and meaning of the ACK/NACK for the multiple data units can be identified by combining a PUCCH resource used in actual ACK/NACK transmission and one of QPSK modulation symbols. This is also referred to as a channel selection. According to a PUCCH in use, the channel selection may be referred to as a PUCCH 1a/1b channel selection.

For example, it is assumed that up to two data units can be transmitted, and one PUCCH resource can carry two bits. It is also assumed that an HARQ operation for each data unit can be managed by one ACK/NACK bit. In this case, the ACK/NACK can be identified at a transmitting node (e.g., a BS) which transmits the data unit according to Table 2 below.

TABLE 2

| HARQ-ACK(0), HARQ-ACK(1) | $n^{(1)}_{PUCCH}$ | b(0), b(1) |
|---|---|---|
| ACK, ACK | $n^{(1)}_{PUCCH,1}$ | 1, 1 |
| ACK, NACK/DTX | $n^{(1)}_{PUCCH,0}$ | 0, 1 |
| NACK/DTX, ACK | $n^{(1)}_{PUCCH,1}$ | 0, 0 |
| NACK/DTX, NACK | $n^{(1)}_{PUCCH,1}$ | 1, 0 |
| NACK, DTX | $n^{(1)}_{PUCCH,0}$ | 1, 0 |
| DTX, DTX | N/A | N/A |

In Table 2, HARQ-ACK(i) indicates an ACK/NACK result for a data unit i. In the above example, two data units may exist, i.e., a data unit 0 and a data unit 1. In Table 2, DTX implies that there is no data unit transmission for the HARQ-ACK(i). Alternatively, it implies that a receiving end (e.g., a UE) fails to detect the data unit for the HARQ-ACK (i). $n^{(1)}_{PUCCH,X}$ indicates a PUCCH resource used in actual ACK/NACK transmission. There are up to 2 PUCCH resources, that is, $n^{(1)}_{PUCCH,0}$ and $n^{(1)}_{PUCCH,1}$. b(0) and b(1) denote 2 bits delivered by a selected PUCCH resource. A modulation symbol transmitted using the PUCCH resource is determined by b(0) and b(1).

For one example, if the receiving end successfully receives two data units and decodes the received data units, the receiving end has to transmit two bits b(0) and b(1) in a form of (1, 1) by using a PUCCH resource $n^{(1)}_{PUCCH,1}$. For another example, it is assumed that the receiving end receives two data units, and in this case, the receiving end fails to decode a first data unit and successfully decodes a second data unit. Then, the receiving end has to transmit (0, 0) by using $n^{(1)}_{PUCCH,1}$.

As such, according to a method in which the content (or meaning) of ACK/NACK is linked to a combination of a PUCCH resource and the content of an actual bit transmitted using the PUCCH resource, ACK/NACK transmission for the multiple data units is enabled by using a single PUCCH resource.

In the ACK/NACK multiplexing method, if at least one ACK exists for all data units, NACK and DTX are basically coupled as NACK/DTX. This is because a combination of a PUCCH resource and a QPSK symbol is not enough to cover all ACK/NACK combinations based on decoupling of the NACK and the DTX.

In the aforementioned ACK/NACK bundling or channel selection, the total number of PDSCHs for which ACK/NACK is transmitted by the UE is important. If the UE fails to receive some of the plurality of PDCCHs for scheduling a plurality of PDSCHs, an error occurs in the total number of PDSCHs for which the ACK/NACK is transmitted, and thus ACK/NACK may be transmitted erroneously. To correct this error, a TDD system transmits the PDCCH by including a downlink assignment index (DAI). The DAI reports a counting value by counting the number of PDCCHs for scheduling the PDSCHs.

Hereinafter, an uplink channel coding method for a PUCCH format 2 will be described.

Table 3 below shows an example of a (20,A) RM code used in channel coding of a PUCCH format 2. Herein, A may denote the number of bits (i.e., $K_{eqi}+K_{ACK/NACK}$) of a bit stream in which a CQI information bit and an ACK/NACK information bit are concatenated. If the bit stream is denoted by $a_0, a_1, a_2, \ldots a_{A-1}$, the bit stream may be used as an input of a channel coding block using the (20,A) RM code.

TABLE 3

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 1 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 1 | 0 | 0 | 1 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |

TABLE 3-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 1 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

Bits $b_0, b_1, b_2, \ldots, b_{B-1}$ which are channel-coded by an RM code may be generated by Equation 1 below.

$$b_i = \sum_{n=0}^{A-1} (a_n \cdot M_{i,n}) \bmod 2 \quad \text{[Equation 1]}$$

In Equation 1 above, i=0, 1, 2, ..., B−1, where B=20. Channel-coded bits are mapped to a code-time-frequency resource.

Now, an example of an uplink channel coding method in LTE-A will be described.

As described above, in LTE, if a UCI is transmitted with a PUCCH format 2, a CSI of up to 13 bits is subjected to RM coding by using the (20, A) RM code of Table 3. Otherwise, if the UCI is transmitted through a PUSCH, a CQI of up to 11 bits is subjected to RM coding through (32, A) RM code of Table 4 below, and truncation or circular repetition is performed to conform to a code rate at which transmission is performed through the PUSCH.

TABLE 4

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 1 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 0 | 1 | 1 | 1 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 0 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

Figure 12:
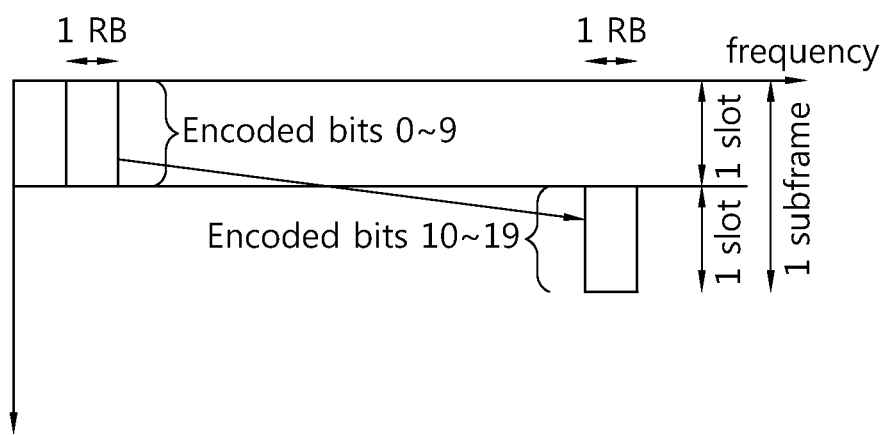
FIG. 12 shows an example of mapping channel-coded bits to a code-time-frequency resource.

FIG. 12 shows an example of mapping channel-coded bits to a code-time-frequency resource.

Referring to FIG. 12, among channel-coded 20 bits, first 10 bits and last 10 bits are mapped to different code-time-frequency resources. In particular, the first 10 bits and the last 10 bits are transmitted by being separated significantly in a frequency domain for frequency diversity.

Meanwhile, in LTE-A, a PUCCH format 3 is introduced to transmit a UCI (ACK/NACK and SR) of up to 21 bits (i.e., the number of bits before channel coding as information bits). In the PUCCH format 3, QPSK is used as the modulation scheme, and the number of bits that may be transmitted in a subframe is 48 bits (this is the number of bits transmitted after the information bit is subjected to channel coding).

The PUCCH format 3 is used to perform transmission based on block spreading. That is, a modulation symbol sequence obtained by modulating multi-bit ACK/NACK by using a block spreading coding is transmitted by being spread in a time domain.

Figure 13:
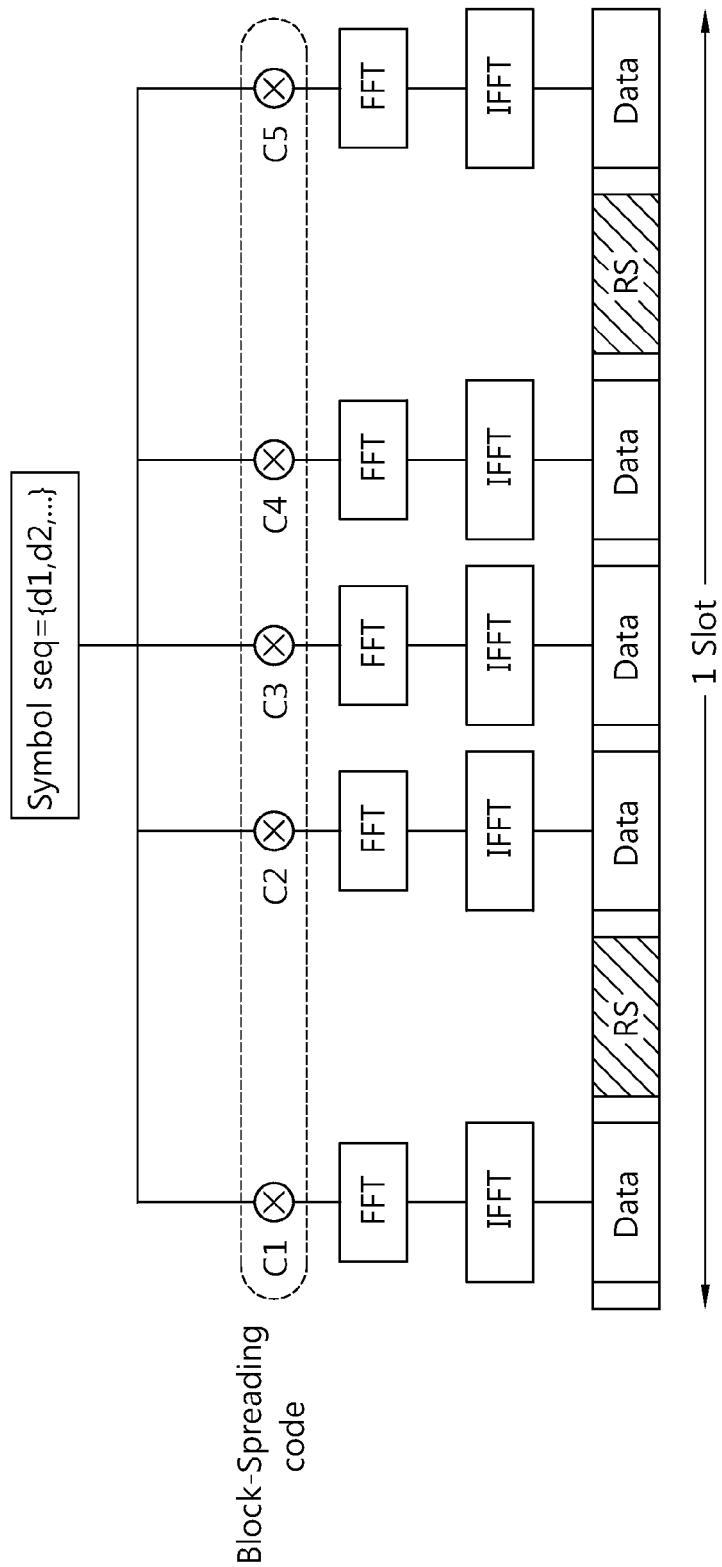
FIG. 13 shows an example of a channel structure of a PUCCH format 3.

FIG. 13 shows an example of a channel structure of a PUCCH format 3.

Referring to FIG. 13, a modulation symbol sequence {d1, d2, . . . } is spread in a time domain by applying a block spreading code. The block spreading code may be an orthogonal cover code (OCC). Herein, a modulation symbol sequence may be a sequence of modulation symbols in which ACK/NACK information bits consisting of multiple bits are subjected to channel coding (by using an RM code, a TBCC, a punctured RM code, etc.) to generate an ACK/NACK coded bit and in which the ACK/NACK coded bits are modulated (e.g., QPSK). The sequence of the modulation symbols is transmitted after mapping to data symbols of a slot through fast Fourier transform (FFT) and inverse fast Fourier transform (IFFT). Although it is exemplified in FIG. 13 that two RS symbols are present in one slot, a case where 3 RS symbols are present is also possible, and in this case, a block spreading code having a length of 4 may be used.

Such a PUCCH format 3 may transmit a channel-coded bit consisting of 48 bits in a normal CP. If a UCI bit (i.e., information bit) is less than or equal to 11 bits, the (32, A) RM coding of Table 4 is used, and circular repetition is used to conform to the number of coded bits of the PUCCH format 3. As shown in Table 4, since the (32, A) RM code has only 11 basis sequences, if the UCI bit is greater than 11 bits, dual RM coding using two (32, A) RM codes is used.

Figure 14:
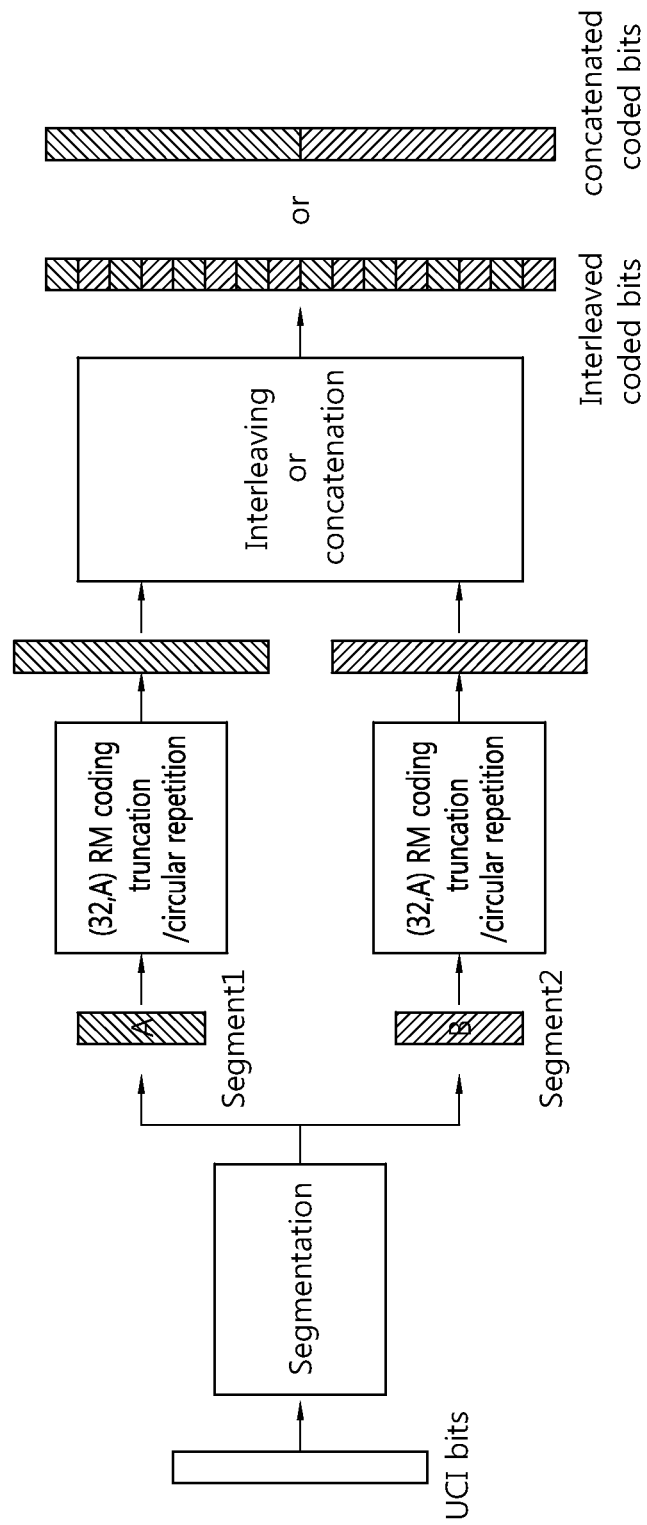
FIG. 14 shows an example of a dual Reed Muller (RM) coding process.

FIG. 14 shows an example of a dual RM coding process.

Referring to FIG. 14, if a UCI bit stream (i.e., information bits) exceeds 11 bits, segmentation is used to generate a segmented bit stream (called a segment). In this case, each of a segment 1 and a segment 2 is less than or equal to 11 bits. Each of the segments 1 and 2 is interleaved or concatenated through the (32, A) RM coding. Thereafter, truncation or circular repetition is transmitted after truncation or circular repetition is performed to conform to the number of coded bits of the PUCCH format 3.

[Method of Transmitting Channel State Information in Wireless Communication System]

In order to utilize a channel capacity given in a wireless communication system to the maximum extent possible, an MCS and a transmission power are regulated according to a given channel by using a link adaptation. In order to perform the link adaptation in a BS, there is a need to feed back channel status information of a UE.

1. Channel Status Information (CSI)

Channel information needs to be fed back for effective communication. In general, downlink channel information is transmitted through an uplink, and uplink channel information is transmitted through a downlink. Channel information indicating a channel status is called a CSI. Examples of the CSI include a precoding matrix index (PMI), a rank indicator (RI), a channel quality indicator (CQI), etc.

The CQI provides a BS with information on a link-adaptive parameter that can be supported by a UE. For example, the CQI may be an index indicating information on a modulation and coding scheme and a transport block size. The PMI indicates information regarding a precoding matrix preferred in codebook-based precoding. The RI indicates the number of layers recommended by the UE, and may be an indicator for recommending the number of streams used in spatial multiplexing.

2. Downlink Transmission Mode

A downlink transmission mode can be classified into 9 types described below.

Transmission mode 1: Single antenna port, port 0.

Transmission mode 2: Transmit diversity.

Transmission mode 3: Open loop spatial multiplexing: It is an open loop mode in which a rank adaptation based on RI feedback is possible. If a rank is 1, the transmit diversity may be applied. If the rank is greater than 1, a large delay CDD may be used.

Transmission mode 4: Closed loop spatial multiplexing or transmission diversity.

Transmission mode 5: Transmit diversity or multi-user MIMO.

Transmission mode 6: Transmit diversity or closed loop spatial multiplexing having single transmission layer.

Transmission mode 7: Single antenna port (port 0) is used when the number of PBCH antenna ports is 1, and otherwise, transmit diversity is used. Alternatively, single antenna port transmission (port 5) is performed.

Transmission mode 8: Single antenna port (port 0) is used when the number of PBCH antenna ports is 1, and otherwise, transmit diversity is used. Alternatively, dual layer transmission is performed using antenna ports 7 and 8, or single antenna port transmission is performed by using the port 7 or the port 8.

Transmission mode 9: Up to 8 layer transmission (ports 7 to 14).

In case of not an MBSFN subframe, if the number of PBCH antenna ports is 1, single antenna port transmission (port 0) is used, and otherwise transmit diversity is used.

In case of the MBSFN subframe, single antenna port transmission (port 7) is performed.

3. Periodic Transmission of CSI.

A CSI may be transmitted periodically through a PUCCH according to a period determined by a higher layer. A UE may be configured semi-statically by a higher layer signal so that a differential CSI (i.e., CQI, PMI, RI) is fed back periodically through the PUCCH. In this case, the UE transmits the CSI according to modes defined by the following table.

TABLE 5

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

For example, in Table 5, the wideband CQI is fed back in the mode 1-0, and the wideband CQI and one PMI are fed back in the mode 1-1. The subband CQI for a subband selected by the UE is fed back in the mode 2-0. The subband CQI and one PMI are fed back in the mode 2-1.

A periodic CSI reporting mode in the PUCCH is supported as follows with respect to each of the aforementioned transmission modes.

TABLE 6

| Transmission mode | PUCCH CSI reporting modes |
|---|---|
| Transmission mode 1 | Modes 1-0, 2-0 |
| Transmission mode 2 | Modes 1-0, 2-0 |

TABLE 6-continued

| Transmission mode | PUCCH CSI reporting modes |
| --- | --- |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | Modes 1-1, 2-1 if PMI/RI reporting is configured to UE; Modes 1-0, 2-0 if PMI/RI reporting is not set to UE |
| Transmission mode 9 | Modes 1-1, 2-1 if PMI/RI reporting is configured to UE, and the number of CSI-RS ports is greater than 1; Modes 1-0, 2-0 if PMI/RI reporting is not set to UE or the number of CSI-RS ports is 1 |

Meanwhile, a collision of CSI reporting implies a case where a subframe configured to transmit a first CSI is the same as a subframe configured to transmit a second CSI. When the collision of CSI reporting occurs, the first CSI and the second CSI may be transmitted simultaneously, or according to a priority of the first CSI and the second CSI, a CSI having a higher priority may be transmitted while giving up (i.e., dropping) transmission of a CSI having a lower priority.

The CSI reporting through the PUCCH may have various reporting types as follows according to a transmission combination of CQI/PMI/RI, and supports a period and offset value classified for each reporting type (hereinafter, simply called a type).

Type 1: CQI feedback for subband selected by UE is supported.

Type 1a: Subband CQI and second PMI feedback is supported.

Type 2, 2b, 2c: Wideband CQI and PMI feedback is supported.

Type 2a: Wideband PMI feedback is supported.

Type 3: RI feedback is supported.

Type 4: Wideband CQI is transmitted.

Type 5: RI and wideband PMI feedback is supported.

Type 6: RI and PTI feedback is supported.

Since the aforementioned types 3, 5, and 6 include an RI, they may be collectively referred to as an RI series.

A subframe in which the UE reports the CSI is called a CSI subframe, and a CSI subframe set consisting of a plurality of CSI subframes may be configured to the UE. If reporting is configured to the UE in two or more CSI subframe sets, 'cqi-pmi-ConfigIndex' and 'ri-ConfigIndex' corresponding to each CSI subframe set are given. For example, if CSI reporting is configured in two CSI subframe sets, 'cqi-pmi-ConfigIndex' and 'ri-ConfigIndex' are for a first CSI subframe set, and 'cqi-pmi-ConfigIndex2' and 'ri-ConfigIndex2' are for a second CSI subframe set.

For each serving cell, a period $N_{pd}$ of a subframe unit and an offset $N_{offset,CQI}$ are determined for CQI/PMI reporting on the basis of a parameter 'cqi-pmi-ConfigIndex'($I_{CQI/PMI}$).

For example, if wideband CQI/PMI reporting is configured, subframes in which reporting is performed on the wideband CQI/PMI may be subframes satisfying the following equation.

$$(10 \times n_f + \lfloor n_s/2 \rfloor - N_{OFFSET,CQI}) \bmod (N_{pd}) = 0 \quad \text{[Equation 2]}$$

In Equation 2, $o_f$ is a system frame number, and $n_s$ is a slot number in a frame.

In addition, for each serving cell, a period $M_{RI}$ and a relative offset $N_{offset,RI}$ are determined for RI reporting on the basis of a parameter 'ri-ConfigIndex'($I_{RI}$). 'cqi-pmi-ConfigIndex' and 'ri-ConfigIndex' are configured by using a higher layer signal such as an RRC message. The relative offset $N_{offset,RI}$ for the RI has a value selected from a set $\{0, -1, \ldots, -(N_{pd}-1)\}$.

If the RI reporting is configured, subframes in which an RI is reported may be subframes satisfying the following equation.

$$(10 \times n_f + \lfloor n_s/2 \rfloor - N_{OFFSET,CQI} - N_{OFFSET,RI}) \bmod (N_{pd} \cdot M_{RI}) = 0 \quad \text{[Equation 3]}$$

As shown in Equation 3, a reporting interval of the RI reporting is $M_{RI}$-fold of $N_{pd}$.

If the wideband CQI/PMI reporting and the subband CQI reporting are both configured, the wideband CQI/PMI and subband CQI reporting may be performed in subframes satisfying the following equation.

$$(10 \times n_f + \lfloor n_s/2 \rfloor - N_{OFFSET,CQI}) \bmod N_{pd} = 0 \quad \text{[Equation 4]}$$

If a precoding type indicator (PTI) is not transmitted (since it is not set) or if a most recently transmitted PTI is 1, wideband CQI/wideband PMI (or wideband CQI/wideband second PMI for a transmission mode 9) reporting has a period of $H \cdot N_{pd}$, and is transmitted in subframes satisfying the following equation.

$$(10 \times n_f + \lfloor n_s/2 \rfloor - N_{OFFSET,CQI}) \bmod (H \cdot N_{pd}) = 0 \quad \text{[Equation 5]}$$

In Equation 5, H is an integer number, and is defined as H=J·K+1. J is a number of a bandwidth part, and K is configured by a higher layer.

If the most recently transmitted PTI is 0, wideband first PMI indicator reporting has a period of $H' \cdot N_{pd}$, and is transmitted in subframes satisfying the following equation.

$$(10 \times n_f + \lfloor n_s/2 \rfloor - N_{OFFSET,CQI}) \bmod (H' \cdot N_{pd}) = 0 \quad \text{[Equation 6]}$$

H' is signaled by a higher layer.

During a time whenever wideband first PMI indicator reporting is performed two times continuously, the remaining reporting opportunities are used for reporting a wideband second PMI indicator and a wideband CQI. If RI reporting is configured, an RI reporting interval is a product of $H \cdot N_{pd}$, which is a wideband CQI/PMI reporting period, and $M_{RI}$. The RI reporting may be performed in subframes satisfying the following equation.

$$(10 \times n_f + \lfloor n_s/2 \rfloor - N_{OFFSET,CQI} - N_{OFFSET,RI}) \bmod (H \cdot N_{pd} \cdot M_{RI}) = 0 \quad \text{[Equation 7]}$$

Figure 15:
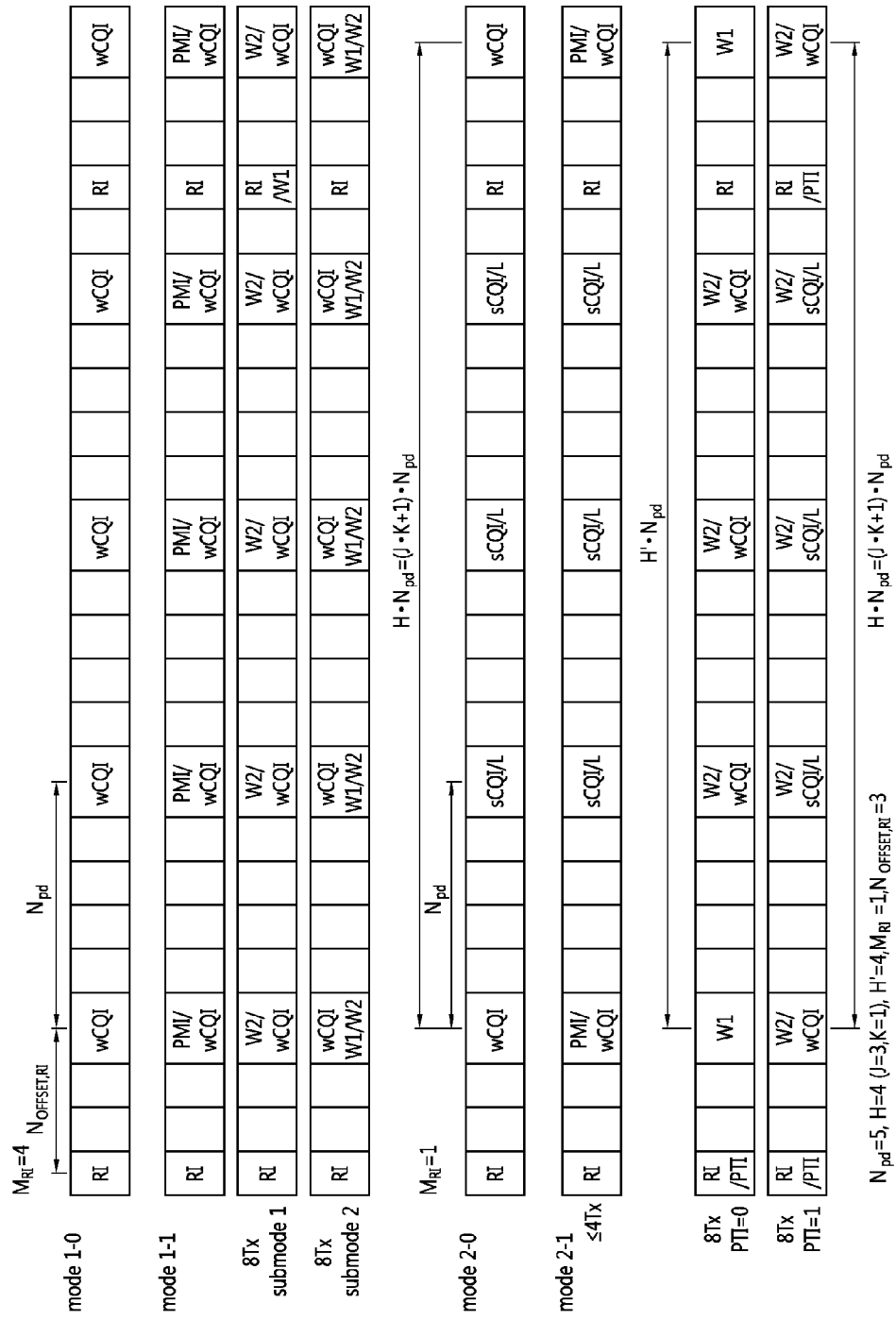
FIG. 15 shows a channel state information (CSI) transmission period and a reporting type according to each mode of Table 5.

FIG. 15 shows a CSI transmission period and a reporting type according to each mode of Table 5 above. However, it is assumed that $N_{pd}$=5, H=4, J=3, K=1, H'=4, $M_{RI}$=1, $N_{OFFSET,RI}$=3. In addition, 'wCQI' denotes a wideband CQI, 'sCQI' denotes a subband CQI, W1 denotes a wideband first PMI indicator, and W2 denotes a wideband second PMI indicator.

Meanwhile, if CSI reporting of a CSI type 3, 5, or 6 for one serving cell collides with CSI reporting of a CSI type 1, 1a, 2, 2a, 2b, 2c, or 4 for the one serving cell, the CSI reporting of the CSI type 1, 1a, 2, 2a, 2b, 2c, or 4 has a lower priority and thus is dropped. This is called <a priority rule of CSI for the same cell>.

If two or more serving cells are configured to the UE, the UE performs only CSI reporting for only one serving cell in a given subframe. In the given subframe, the CSI reporting of the CSI type 3, 5, 6, or 2a of a first cell may collide with the CSI reporting of the CSI type 1, 1a, 2, 2b, 2c, or 4 of a second cell. In this case, the CSI reporting of the CSI type 1, 1a, 2, 2b, 2c, or 4 has a lower priority and thus is dropped.

In a given subframe, the CSI reporting of the CSI type 2, 2b, 2c, or 4 of the first cell may collide with the CSI reporting of the type 1 or 1a of the second cell. In this case, the CSI reporting of the CSI type 1 or 1a has a lower priority and thus is dropped. The first cell and the second cell are different from each other.

In a given subframe, CSI reporting of a CSI type having the same priority of different serving cells may collide. In this case, a CSI of a serving cell having a lowest serving cell index ServCellIndex is reported, and CSIs of all other serving cells are dropped.

4. Aperiodic Transmission of CSI

A PUSCH scheduling control signal transmitted through a PDCCH, that is, a UL grant, may include a control signal for requesting transmission of a CSI, that is, an aperiodic CSI request signal. In this case, a UE aperiodically reports the CSI through the PUSCH.

1) Transmission of CQI/PMI/RI Through PUSCH after Receiving CQI Transmission Request Signal (i.e., CQI request).

In this case, a control signal (i.e., CQI request) for requesting transmission of a CQI is included in a PUSCH scheduling control signal (i.e., UL grant) transmitted through a PDCCH. Table 7 below shows a mode when CQI/PMI/RI are transmitted through the PUSCH.

TABLE 7

| | | PMI Feedback Type | | |
|---|---|---|---|---|
| | | No PMI | Single PMI | Multiple PMI |
| PUSCH CQI feedback type | Wideband (wideband CQI) | | | Mode 1-2 |
| | UE Selected (subband CQI) | Mode 2-0 | | Mode 2-2 |
| | Higher Layer-configured (subband CQI) | Mode 3-0 | Mode 3-1 | |

The transmission mode of Table 7 may be indicated by a higher layer signal transmitted by the BS, and CQI/PMI/RI may be all transmitted through a PUSCH of the same subframe. The mode 2-1, mode 2-0, mode 2-2, mode 3-0, and mode 3-1 of Table 7 are described below.

1-1) Mode 1-2

A precoding matrix is selected under the assumption that data is transmitted for each subband only through a corresponding subband. A UE generates a CQI by assuming a selected precoding matrix as to a system band or a whole band (called a band set S) designated by a higher layer signal.

The UE transmits the CQI and a PMI value of each subband. In this case, a size of each subband may vary depending on a size of the system band.

1-2) Mode 2-0

A UE selects preferred M subbands as to a system band or a band (i.e., a band set S) designated by a higher layer signal. The UE generates one CQI value under the assumption that data is transmitted in the selected M subbands. The UE additionally generates one CQI (i.e., wideband CQI) as to the system band or the band set S.

When a plurality of codewords are present for the selected M subbands, a CQI value for each codeword is defined in a differential form. It can be obtained such as: Differential CQI=Index corresponding to CQI value for selected M subbands−wideband CQI index.

The UE transmits information regarding a location of the selected M subbands, one CQI value for the selected M subbands, and a CQI value generated for a system band of a band set S. In this case, a subband size and a value M may vary depending on a size of the system band.

1-3) Mode 2-2

A UE selects a location of M preferred subbands and a single precoding matrix for the M preferred subbands simultaneously under the assumption that data is transmitted through M preferred subbands.

A CQI value for the M preferred subbands is defined for each codeword. The UE additionally generates a wideband CQI value as to the system band or the band set S.

The UE transmits information regarding the location of the M preferred subbands, one CQI value for the selected M subbands, a single precoding matrix index (PMI) for the M preferred subbands, a wideband precoding matrix index, and a wideband CQI value. In this case, the subband size and the value M may vary depending on the size of the system band.

1-4) Mode 3-0

A UE generates a wideband CQI value. The UE generates a CQI value for each subband under the assumption that data is transmitted through each subband. In this case, even if RI>1, the CQI value indicates only a CQI value for a first codeword.

1-5) Mode 3-1

A single precoding matrix is generated for a system band or a band set S. A UE generates a CQI for a subband per codeword by assuming a single precoding matrix generated previously as to each subband. The UE may generate a wideband CQI by assuming the single precoding matrix.

A CQI value of each subband is expressed in a differential form. That is, it can be obtained such as: 'Subband CQI=Subband CQI index−Wideband CQI index'. A subband size may vary depending on a size of a system band.

Now, the present invention will be described. Hereinafter, a CSI implies a periodic CSI.

According to the conventional technique, when a transmission period of CSI collides for a plurality of DL cells, only a CSI for one DL cell is selected and transmitted, and the remaining CSIs are dropped. In addition, if a CSI collides with (uplink) ACK/NACK (in particular, multiple ACK/NACK for a plurality of DL cells) for a PDSCH, the CSI is dropped. According to the conventional technique, a completeness of periodic CSI reporting deteriorates, which leads to a loss of a system throughput. In particular, such a problem is more serious in case of TDD in which the number of UL subframes is limited.

Therefore, in a future wireless communication system, it is considered to simultaneously transmit CSIs for a plurality of DL cells in the same UL subframe even if a collision occurs in CSI transmission for a plurality of DL cells (i.e., even if a CSI transmission period for the plurality of DL cells overlaps in one UL subframe). Reporting of the CSIs for the plurality of DL cells as such is also called multiple periodic CSI reporting.

The multiple periodic CSI reporting may be transmitted through a PUCCH or a PUSCH. When transmitted through the PUSCH, the PUSCH may be scheduled according to the number (or amount) of periodic CSIs of which a transmission period overlaps in a corresponding subframe in case of performing dynamic PUSCH scheduling (i.e., scheduling performed on the PUSCH by a UL grant or scheduling is performed on the PUSCH by a PDCCH indicated by SPS (re)activation).

Semi-persistent scheduling (SPS) implies that a BS schedules transmission semi-statically through RRC signaling. A UE performs or releases SPS-PDSCH reception or SPS-PUSCH transmission upon reception of an activation or release signal of SPS transmission through a PDCCH. That is, the UE does not immediately perform SPS transmission/ reception even if SPS scheduling is allocated through RRC signaling. Instead, when the activation or release signal is received through the PDCCH, the SPS transmission/reception is performed in a subframe corresponding to a subframe period and offset value assigned through RRC signaling by applying a frequency resource (i.e., resource block) based on a resource block allocation designated by the PDCCH and a modulation and coding rate based on MCS information. In this case, the PDCCH for releasing the SPS is called an SPS release PDCCH, and the PDCCH for activating the SPS is called an SPS activation PDCCH. A PDSCH of a subframe in which the SPS activation PDCCH is received is subjected to dynamic scheduling, but an SPS-PDSCH which comes next is scheduled without a UL grant (PDCCH).

However, there may be a method by which a PUSCH resource is transmitted by being allocated semi-statically without a UL grant similarly to SPS and a method by which a periodic PUSCH is transmitted by designating a PUSCH resource through RRC (this may be regarded as one of PUCCH formats which utilize a structure of the PUSCH). Alternatively, in case of a non-adaptive retransmission PUSCH on the basis of a NACK response of a PHICH without a UL grant, if the number of periodic CSIs in which a collision occurs is different from that of initial resource allocation, a PUSCH resource may be insufficient or may be wasted and an expected data decoding performance may not be expected.

Accordingly, there is a need for a method capable of decreasing or avoiding such a phenomenon. In addition, there is a need for a method for effectively transmitting multiple periodic CSIs.

A DL cell (more specifically, a DL CC) which is a target of multiple periodic CSIs transmitted through a scheduled PUSCH (for example, by a UL grant or an SPS activation PDCCH) or a PUCCH (i.e., a PUCCH format 2, a PUCCH format 3, a format having a PUSCH type, etc.) may be all activated DL CCs in which a periodic CSI reporting mode is configured or may be an activated DL CC configured with RRC. One DL CC is also possible, and a periodic CSI transmission target DL CC may be additionally configured.

In addition, DL CCs which are targets of the multiple periodic CSIs may be grouped to decrease a resource shortage phenomenon. Which DL CCs are grouped as one group may be configured by an RRC message. One group may be distinguished from another group according to a transmission period. In this case, CSI periods of the DL CCs in one group may be configured to be all identical or to be related such that one is a multiple of another. A period configuration of an RI series among the CSI periods may be designated independently from a period of another CSI (e.g., CQI/PMI). In case of a DL CC in which there is no transmission of the RI series, a period of the RI series may be ignored.

Figure 16:
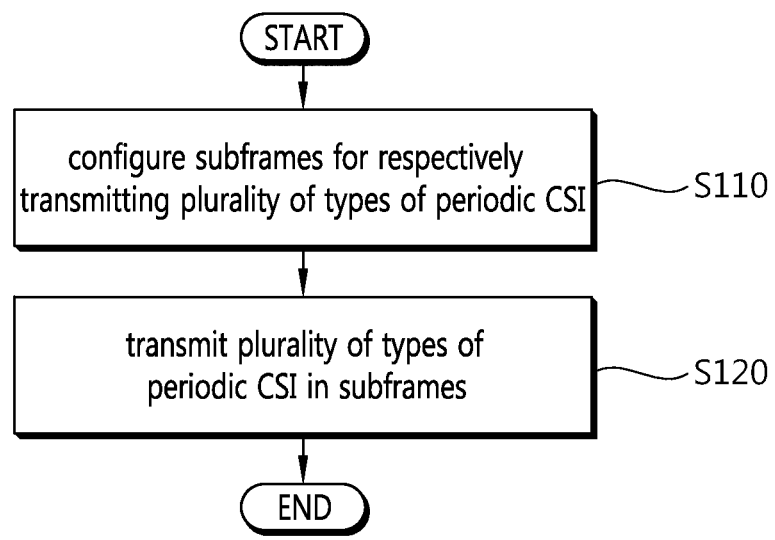
FIG. 16 shows an example of a periodic CSI transmission method of a user equipment.

FIG. 16 shows an example of a periodic CSI transmission method of a UE.

Referring to FIG. 16, subframes for respectively transmitting a plurality of types of periodic CSI are configured (step S110). Then, the plurality of types of periodic CSI are transmitted in the subframes (step S120). The plurality of types of periodic CSI may be transmitted through a control channel (e.g., PUCCH) or data channel (e.g., PUSCH) of the same subframe. In this case, how to transmit the plurality of types of periodic CSI is a matter to be considered.

Figure 17:
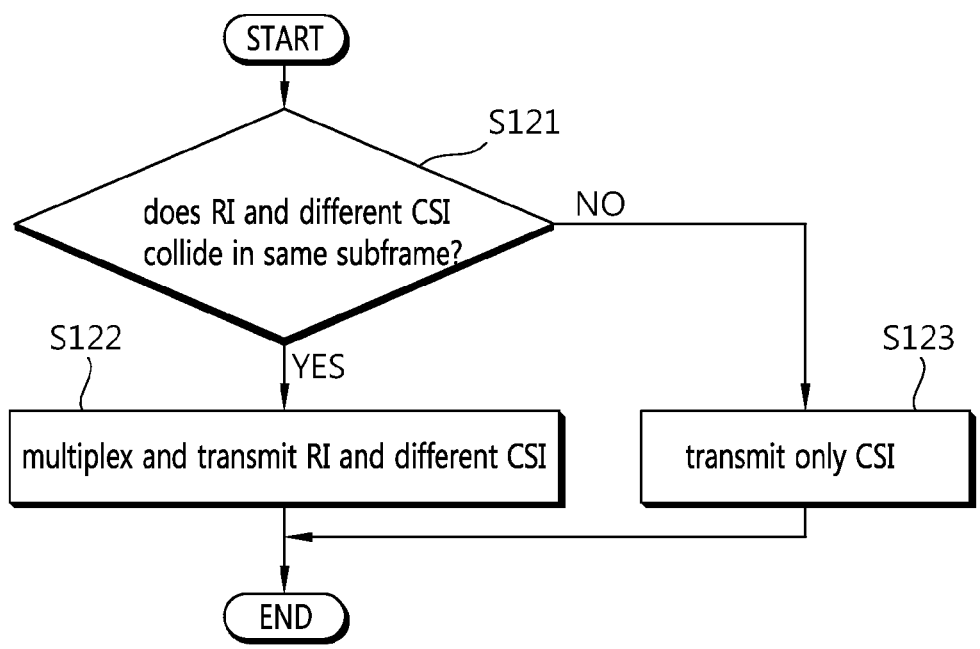
FIG. 17 shows an example of a method of transmitting a plurality of types of periodic CSI.

FIG. 17 shows an example of a method of transmitting a plurality of types of periodic CSI.

Referring to FIG. 17, it is determined whether a collision occurs between an RI and a different CSI (e.g., CQI/PMI) in a subframe in which the periodic CSI is transmitted (step S121). If the collision occurs, the RI and the different CSI are transmitted together through multiplexing (step S122), and otherwise if the collision does not occur, only the CSI is transmitted (step S123).

For example, if $N_{OFFSET,RI}$, i.e., a transmission time offset of an RI series, is set to 0, a non-RI series CSI reporting type of the same DL cell which collides by the setting of the transmission time offset value of the RI series may be transmitted through multiplexing, instead of dropping.

Meanwhile, if CSI reporting of another DL cell also collides in a subframe in which a plurality of CSIs for the same DL cell collide, it may be transmitted together through multiplexing. In case of transmitting CSIs for a plurality of DL cells through a PUSCH, multiplexing of the RI series of the same DL cell and the non-RI series CSI reporting type may be configured to operate when a multiple periodic CSI transmission mode is configured.

Alternatively, signaling (for example, through an RRC message) may be performed to determine whether to multiplex or drop the RI series and non-RI series of the same DL cell. In addition, it may be always configured to $N_{OFFSET,RI}=0$ in a corresponding mode.

In the conventional method, when only a CSI of a single cell is transmitted, a PUCCH format 2 is used for a feedback of a periodic CSI consisting of up to 11 bits. In addition, if RI series information and non-RI series information collide in the same subframe, a sum thereof may exceed 11 bits. In this case, in order to guarantee an implementation simplicity and a decoding capability of the RI information, the RI series information which is relatively not important is dropped and only the RI series information which is important is transmitted. This is because a coverage may decrease due to an increase in a payload when the RI series information and the non-RI series information are transmitted in combination.

In addition, in a case where a non-RI series CSI is small in amount as in the mode 1-0 and the mode 1-1 of Table 5 above, even if only an RI is transmitted while dropping the non-RI series CSI, it is only that an update period for the non-RI series CSI is postponed one time, and a performance problem may not be significant.

On the other hand, multiple periodic CSI transmission is configured mainly when a channel state of a UE is good. In addition, in case of the mode 2-0 and the mode 2-1 of Table 5, dropping is not preferable since a CSI reporting type is important in which an RI series collides.

For example, assume that a primary cell is configured with the mode 2-1, a secondary cell is configured with the mode 1-0, and if RI reporting is required, a PUCCH format 3 is used for multiple periodic CSI transmission. In this case, it may be configured to $N_{OFFSET,RI}=0$, and thus an RI and PMI of the primary cell may collide with a wideband CQI of the secondary cell in the same subframe. In this case, if the conventional <priority rule of CSI for the same cell> is applied to the primary cell, the PMI is dropped. On the other hand, the wideband CQI of the secondary cell may be completely transmitted since it is a CSI of a different cell. However, since the PMI is relatively important information in comparison with the wideband CQI, it is more preferable to transmit the PMI. This is because the wideband CQI of the secondary cell has a less effect even if it is transmitted in a next period. Therefore, it is more preferable in the above example that the RI and PMI of the primary cell are transmitted and the wideband CSI of the secondary cell is dropped.

For another example, in a case where a PUSCH is used for multiple periodic CSI transmission, if ½ coding is applied by setting the number of transmissible coded bits to 288 bits, an information bit consisting of 144 bits can be transmitted. Therefore, even if 55 bits are transmitted as the maximum number of CSI bits for 5 DL cells, there may be remaining resources. Accordingly, it is not preferable to drop a non-RI series when an RI series and a non-RI series collide in the same DL cell when $N_{OFFSET,RI}=0$.

In addition, for such a case where there are remaining resources, if the multiple periodic CSI transmission is configured, it may be preferable in terms of resource utilization to set $N_{OFFSET,RI}=0$ and not to allocate an additional period and resource for an RI.

In addition, in order to decrease a change in a payload amount of CSI transmitted in each period, a start point of a CSI content may be regulated between cells. That is, it may be configured such that, in a subframe in which a wideband CSI of one specific cell is transmitted, a subband CSI of a different cell is transmitted, whereas in a next period, a subband CSI for the specific cell is transmitted and the wideband CQI of the different cell is transmitted.

Alternatively, a grouped and periodically transmitted CSI may allow CSI information to be transmitted in one subframe in a periodic CSI mode, instead of being transmitted in subframes in a split manner according to a period.

In addition, if a period collides between periodic CSI groups, only one group may be selectively transmitted while dropping the remaining groups.

In addition, among periodic CSI groups, a single periodic CSI may be dropped if it collides with a multiple periodic CSI group.

Hereinafter, a detailed method for applying the aforementioned methods will be described. This method may be applied when multiple periodic CSIs are transmitted with a PUSCH structure. It may also be applied not only to an operation for a case where the CSI is piggybacked together with UL data through a PUSCH but also to a case where the PUSCH is allocated to transmit only the CSI without the UL data.

A CSI reporting period may be identically set in DL cells which are targets of the multiple periodic CSIs. The period may be identically set to an integer multiple of an HARQ process period, a divisor of the HARQ process period, or a PUSCH transmission period based on SPS.

1) CSI reporting to a PUSCH without a UL grant may be performed only for pre-designated one or multiple DL cells. That is, DL cells which are targets of the CSI reporting may be limited to the predetermined one or multiple DL cells. In particular, this method may be applied when a periodic CSI is piggybacked on the PUSCH.

2) CSI reporting to a PUSCH without a UL grant may be performed only for designated DL cells through RRC/MAC/PDCCH. That is, DL cells which are targets of the CSI reporting may be limited to the predetermined DL cells. The determined DL cells may be DL cells for transmitting a periodic CSI different from a periodic CSI group transmitted through a PUSCH scheduled by a UL grant.

3) CSI reporting to a PUSCH without a UL grant may be transmitted by up to the fixed number of payloads (herein, the number of payloads may differ for each reporting type. For example, a CQI is transmitted by up to 11 bits, an RI is transmitted by up to 2 bits, and a PTI is transmitted by up to 1 bit). That is, the CSI reporting to the PUSCH without the UL grant may be limited to a specific number of payloads.

4) CSI reporting to a PUSCH without a UL grant may be transmitted by up to the designated number of payloads through RRC/MAC/PDCCH.

5) CSI reporting to a PUSCH without a UL grant may be transmitted according to 'CSI information transmitted through a latest PUSCH having a UL grant of the same HARQ process (or the number of DL cells or the number of CSI payloads)'.

6) CSI reporting to a PUSCH without a UL grant may be transmitted according to 'CSI information transmitted through a first PUSCH having a UL grant of the same HARQ process (or the number of DL cells or the number of CSI payloads)'.

7) If CSI reporting to a PUSCH scheduled with SPS is transmitted, it may be transmitted according to latest 'CSI information of a PUSCH of a time point at which (re) activation is applied (or the number of DL cells or the number of CSI payloads)'.

8) In case of a PUSCH scheduled by a UL grant, CSI information (or the number of DL cells or the number of CSI payloads) may be transmitted by being adaptively determined according to the number of scheduled resource blocks (RBs), MCS, and a transport block (TB) size.

9) A single period CSI may be transmitted unconditionally, and in case of an additional CSI, a UE may select whether to perform transmission. The UE may perform coding on the additional CSI separately and perform puncturing on a last part of UL data, and thereafter may perform transmission through that part. A BS may detect the additional CSI through blind decoding.

In the aforementioned methods 1) to 9), an RI series may be transmitted exceptionally for all activated DL cells in which a CSI transmission period overlaps or all activated DL cells belonging to a periodic CSI group.

In addition, in the aforementioned methods 1) to 9), if a PUSCH without a UL grant exists in a primary cell and if a PUSCH scheduled by a UL grant of a secondary cell exists in the same subframe, 'only CSI that fails to be transmitted on the primary cell' or 'all CSI of which a period overlaps' may be transmitted through the PUSCH scheduled by the UL grant.

In addition, the methods 3) and 4) are also applicable to 'PUCCH'/'PUSCH scheduled by UL grant'/, and 'PUSCH without UL grant', and independent RRC configurations are possible respectively.

In addition, the methods 8) and 9) are also applicable to 'PUCCH'/'PUSCH scheduled by UL grant'/, and 'PUSCH without UL grant'.

In the methods 3 to 8), when transmission is achieved according to the number of CSI payloads, only an RI series (RI/PTI/W1, etc.) may be included.

In addition, in the aforementioned methods 1) to 9), an information amount of CSI (or the number of DL cells or an upper limit or restriction on the number of CSI payloads) may vary according to whether ACK/NACK exists (i.e., whether ACK/NACK is multiplexed to a PUSCH in addition to the CSI). For example, if the ACK/NACK exists, the upper limit of the CSI may be lower than a case where the ACK/NACK does not exist.

In the aforementioned methods 1) to 9), in order to transmit a CSI which is subjected to grouping (that is, a group of DL cells which are targets of a multiple periodic CSI, where a corresponding group may consist of only one DL cell), a periodic resource (e.g., PUSCH) may be allocated by using RRC or SPS. In addition, in order to respectively transmit CSIs of a plurality of groups, a periodic PUSCH for each group or a PUSCH scheduled by SPS may be allocated independently. It may be allocated to different cells, or may be allocated to the same cell (for example, a primary cell). In case of being allocated to the different cells, when a CSI collision occurs, simultaneous transmission is performed. In case of being allocated to the same cell, when CSIs of different groups collide in the same subframe, only one group may be selected according to a priority rule, and the remaining groups may be dropped.

Alternatively, when the CSI collision occurs in the same cell, CSIs of all groups may be transmitted by adaptively increasing a PUSCH resource.

In addition, in case of being allocated to the same cell, simultaneous triggering may be achieved by one SPS activation PDCCH. In this case, only a start offset may be set differently from a per-group CSI transmission subframe period configured in advance using RRC in the same PUSCH resource block allocation.

A group to be activated/released may be indicated through a PDCCH authentication for an SPS activation/release, and an activation/release for a plurality of groups (i.e., a plurality of combinations configured in advance using RRC) may be indicated. The indication may be performed by using 'SPS-C-RNTI' for a CSI for each group or for each group combination, or by adopting a specific bit field of the PUCCH authentication.

In order to adaptively increase a PUSCH resource when CSIs of the different groups collide in the same cell, instead of using an SPS PUSCCH resource block (RB) resource allocated independently for each group as independent PUSCHs (herein, each of them is subjected to DFT spreading), it is considered to perform transmission by combining the resources into one PUSCH resource (herein, one DFT spreading is performed on all resources).

That is, if RB resources of all groups overlap or are contiguous, they are used as one contiguous PUSCH, and if the RB resources of the all groups do not overlap and are non-contiguous, the non-contiguous RB resources may be transmitted by using a clustered DFT-s-OFDM method (i.e., single DFT spreading is applied and thereafter is mapped to each RB cluster). In this case, a CSI of each group may be transmitted by being separate-coded and then be mapped to an RB resource of each group before DFT, or may be transmitted by being joint-coded and being mapped to the RB resources of the all groups. If one activation PDCCH is transmitted as to a combination of groups having a different period, the number of RBs for a case where the period collides and the number of RBs for a case where the CSI of each group is transmitted alone may be reported, or the number of adaptive RBs may be acquired through calculation according to the number of DL cells of the CSI.

In the aforementioned methods 1) to 9), if the CSI is activated/released using the SPS PUSCH, CSI information of an aperiodic CSI mode as shown in Table 5 may be transmitted.

If the CSI is transmitted using the SPS PUSCH in the periodic PUSCCH CSI mode, it may be triggered by a CSI request field of the SPS activation PDCCH, and a target DL cell of the CSI may use the same value as a DL cell group for aperiodic CSI mapped to 4 states consisting of 2 bits of the CSI request field.

An SPS PUSCH implies a PUSCH resource configured semi-statically, and in particular, implies a PUSCH resource configured without a corresponding PDCCH. In other words, it implies a PUSCH which does not have a control channel directly mapped to the PUSCH in a 1:1 manner. However, if the SPS PUSCH is triggered through a PDCCH indicating an SPS activation, it can be seen that the PUSCH corresponds to the SPS activation PDCCH, and thus it may be a PUSCH exceptionally having a corresponding control channel. Such a PUSCH may include, or not include, the SPS PUSCH.

<Operation of PUSCH (e.g., PUSCH Configured with SPS or Configured with RRC) for Transmitting Only SR and CSI>

Conventionally, a CSI is always dropped when only a positive SR and the CSI collide. This is because, in order to maintain a single-carrier property, it is not preferable to transmit two UL channels simultaneously in one subframe of one cell. In addition, since the positive SR is relatively more important than the CSI, the positive SR is transmitted.

However, since a plurality of CSIs are transmitted in one subframe in a multiple CSI configuration, dropping of all multiple CSIs may lead to a significant decrease in a feedback efficiency of the CSI. Therefore, it is necessary to decrease the dropping of the CSI by applying the following methods.

In the cases i) and ii) below, if a subframe in which a corresponding PUSCH (/PUCCH) will be transmitted is an SR subframe, a method A, B, or C described below may be applied.

i) A case where it is configured to transmit only a CSI without UL data through a periodic PUSCH/PUCCH or an SPS PUSCH, that is, it is configured to transmit only the CSI periodically through the PUSCH or the PUCCH or only the CSI is transmitted through a PUSCH scheduled with SPS, or ii) a case where a PUSCH/PUCCH resource pre-designated to transmit only the CSI is triggered from a DL grant or a UL grant, that is, it is explicitly triggered to transmit only the CSI through a PUSCH.

Method A: A PUSCH(/PUCCH) is dropped always in case of a positive SR, and a PUCCH defined for the positive SR is transmitted.

Method B: In case of a positive SR, a PUCCH defined for the positive SR is transmitted, and simultaneous transmission is achieved if a PUSCH(/PUCCH) is configured in a secondary cell, whereas the PUSCH is dropped if the PUSCH(/PUCCH) is configured in a primary cell. This method may be applied only when simultaneous transmission of the PUCCH and the PUSCH is configured by a higher layer signal.

Method C: An SR bit field is reserved for a corresponding PUSCH/PUCCH. For example, a position for SR transmission may be secured at a specific position of the PUSCH, or an SR may be transmitted in a specific bit or state of a CSI field transmitted through the PUSCH.

In the aforementioned methods, the same technical features may also be applied to a secondary cell by replacing with a cell provided by a BS.

<Transmission Operation of PUSCH Configured by SPS or RRC Message to Transmit Only Scheduled PUSCH and CSI for Data Transmission Based on UL Grant (or SPS)>

Conventionally, a PUSCH for transmitting only a CSI is scheduled aperiodically by a UL grant. Therefore, there is no case where a PUSCH for transmitting only the CSI and the PUSCH scheduled for data transmission are scheduled simultaneously in one cell.

However, if the PUSCH for transmitting only the CSI is configured using an RRC message or SPS, the two PUSCHs may be scheduled simultaneously in one cell. This leads to simultaneous transmission in which a single-carrier feature is not maintained, and as a result, uplink transmission not having a good peak to average power ratio (PAPR) is achieved.

Accordingly, it is preferable to apply the following method so that only one possible PUSCH is transmitted while decreasing dropping of the CSI.

The following methods A to C may be applied when a periodic PUSCH(/PUCCH) for transmitting only a CSI is configured or a PUSCH is configured using SPS to transmit only the CSI (such a PUSCH is simply referred to as a first PUSCH) and when a PUSCH for data transmission is scheduled using a UL grant in the same subframe of the same cell for transmitting a corresponding PUSCH/PUCCH (such a PUSCH is simply referred to as a second PUSCH).

Method A: A first PUSCH may be dropped and only a second PUSCH may be transmitted. If a CSI feedback is requested in a UL grant, the requested CSI may be transmitted.

Method B: A first PUSCH may be dropped and a CSI to be transmitted through the first PUSCH may be transmitted through a second PUSCH in a piggyback manner. If the CSI is requested by a UL grant (or SPS), the requested CSI is transmitted and the CSI of the first PUSCH is dropped.

Method C: If a first PUSCH and a second PUSCH are transmitted simultaneously and a CSI is requested by a UL grant (or SPS), the requested CSI is transmitted and the first PUSCH is dropped.

In the aforementioned methods, the same technical features may also be applied to a secondary cell by replacing with a cell provided by a BS.

<Transmission Operation of ACK/NACK and 'PUSCH for Transmitting Only CSI Configured by SPS or RRC Message'>

Conventionally, a PUSCH which transmits only a CSI is aperiodically scheduled by a UL grant. Therefore, a PUSCH resource is allocated by considering an amount of an ACK/NACK feedback which occurs in a corresponding subframe, or a power control may be performed by using a transmission power control (TPC) field of the UL grant.

However, if the PUSCH for transmitting only the CSI is configured using the RRC message or the SPS, it may be necessary to reserve resources more than necessary in order to avoid a decrease in resources capable of transmitting the CSI when ACK/NACK is generated.

However, if it is not guaranteed that the ACK/NACK always exists in a CSI transmission subframe and if scheduling is performed only in a primary cell and thus an average ACK/NACK feedback amount is small, an unnecessary resource allocation may occur by using the aforementioned method.

Thereafter, the following method may be applied to effectively transmit a PUSCH which transmits only a CSI.

In a case where a periodic PUSCH(/PUCCH) for transmitting only a CSI is configured or the PUSCH for transmitting only the CSI is configured by SPS or the PUSCH for transmitting only the CSI is explicitly triggered, if ACK/NACK transmission is also required in an uplink subframe in which the PUSCH will be transmitted, one of the following methods A to D may be applied.

Method A: a method of transmitting ACK/NACK by piggybacking it on a PUSCH for transmitting only a CSI.

Method B: a method of dropping a PUSCH for transmitting only a CSI and for transmitting ACK/NACK through a PUCCH.

Method C: a method in which ACK/NACK for a specific situation is transmitted by piggybacking it on a PUSCH for transmitting only a CSI, and as to ACK/NACK for the remaining situations, only the ACK/NACK is transmitted and the PUSCH for transmitting only the CSI is dropped. Herein, the ACK/NACK for the specific situation implies ACK/NACK for a case where a reception failure occurs regarding an ACK/NACK resource indicator (ARI) (herein, a TPC field may be adopted) indicating a resource for transmitting the ACK/NACK in a DL grant for scheduling a data unit which is a target of the ACK/NACK, or implies ACK/NACK to be transmitted using a PUCCH format 1a/1b. In addition thereto, the ACK/NACK may be ACK/NACK for a case where the ARI is received or ACK/NACK to be transmitted using a PUCCH format 3.

That is, in a case where ACK/NACK indicating a reception confirmation for a data unit is transmitted in a single subframe among subframes configured to respectively transmit a plurality of types of periodic CSI, if the ACK/NACK is the ACK/NACK for the specific situation, it is transmitted together with data by being piggybacked on a data channel of the single subframe, and in other cases, only the ACK/NACK is transmitted and PUSCH transmission in which only the CSI is transmitted is dropped.

Method D: If a PUSCH for transmitting only a CSI exists in a secondary cell, ACK/NACK is transmitted simultaneously by using a PUCCH format transmitted in a primary cell, and if the PUSCH for transmitting only the CSI exists in the primary cell, transmission is achieved by using one of the aforementioned methods A, B, and C.

In the aforementioned methods A to D, if ACK/NACK is transmitted by being piggybacked on the PUSCH for transmitting only the CSI, transmission power of the PUSCH may be increased by considering a capability requirement of the ACK/NACK and a decrease in a resource for transmitting the CSI. That is, transmission power may be more increased than a case where the ACK/NACK is not piggybacked. A power offset value requested to increase the transmission power may be configured by a BS through an RRC message, or may be determined by a UE according to the number of payloads of the ACK/NACK and/or the number of resource elements occupied by coded ACK/NACK bits.

In the aforementioned methods, the same technical features may also be applied to a secondary cell by replacing with a cell provided by the BS.

Figure 18:
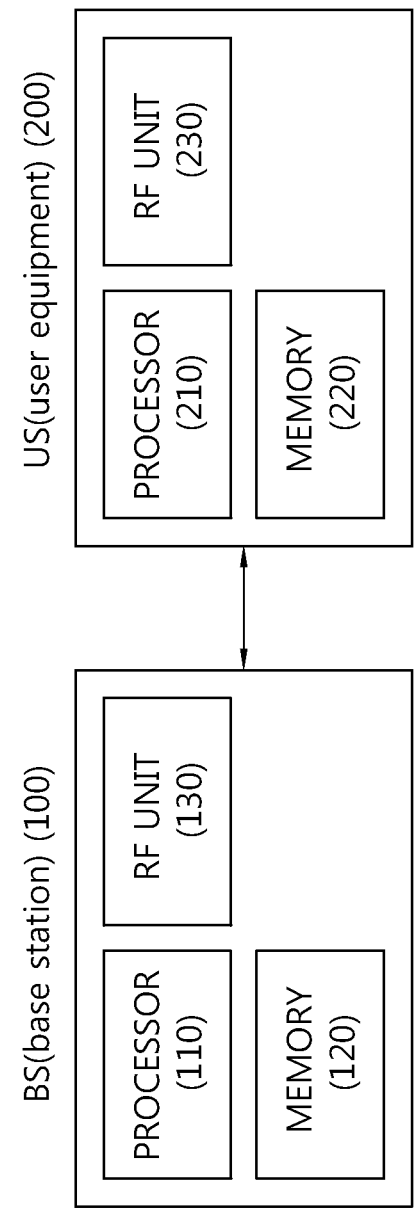
FIG. 18 is a block diagram of a base station and a user equipment according to an embodiment of the present invention.

FIG. 18 is a block diagram of a BS and a UE according to an embodiment of the present invention.

A BS 100 includes a processor 110, a memory 120, and a radio frequency (RF) unit 130. The processor 110 implements the proposed functions, procedures, and/or methods. Layers of a radio interface protocol may be implemented by the processor 110. The processor 110 may configure subframes for respectively transmitting a plurality of types of periodic CSI, for example, through a higher layer signal, and may receive the plurality types of CSI in a corresponding subframe. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. Layers of a radio interface protocol may be implemented by the processor 210. For example, the processor 210 may configure subframes for respectively transmitting a plurality of types of periodic CSI, and may transmit the plurality of types of periodic CSI in those subframes. In this case, if the plurality of types of CSI include an RI and it is configured that the RI and a different periodic CSI other than the RI are transmitted in the same subframe, the RI and the different periodic CSI may be transmitted by multiplexing in the same subframe. In addition, ACK/NACK for a specific situation may be transmitted in a piggyback manner through a data channel of the subframe. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, and/or a data processing unit. The memories 120 and 220 may include a read-only memory (ROM), a random access memory (RAM), a flash memory, a memory card, a storage medium, and/or other equivalent storage devices. The RF units 130 and 230 may include a base-band circuit for processing a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method of transmitting uplink control information (UCI), performed by a user equipment (UE), in a wireless communication system, the method comprising:
   configuring a subframe for respectively transmitting a plurality of types of periodic channel state information (CSI) including a first CSI and a second CSI,
   wherein the first CSI is a rank indicator (RI) indicating the number of layers recommended by the UE, and the second CSI is a CSI which is different from the RI; and
   transmitting the plurality of types of periodic CSI via a data channel of the subframe,
   wherein the first CSI and the second CSI are transmitted by multiplexing in the subframe,
   wherein an acknowledgement/not-acknowledgement (ACK/NACK) is transmitted by being piggybacked on the data channel when it fails to receive a specific field indicating a resource for transmitting the ACK/NACK in a downlink grant for scheduling a data unit.

2. The method of claim 1, wherein the second CSI includes a precoding matrix index (PMI) indicating an index of a precoding matrix preferred by the UE or a channel quality indicator (CQI) indicating a modulation and coding scheme preferred by the UE.

3. The method of claim 1, wherein the first CSI and the second CSI are for a first cell among a plurality of cells configured to the UE.

4. The method of claim 3, wherein if it is configured to transmit a periodic CSI for a different cell other than the first cell among the plurality of cells in the subframe, the periodic CSI for the different cell is also transmitted by multiplexing in the subframe.

5. The method of claim 1, wherein transmission power of the data channel of the subframe is greater than a case where the ACK/NACK is not piggybacked.

6. A user equipment comprising:
   a radio frequency (RF) unit configured to transmit or receive a radio signal; and
   a processor operatively coupled to the RF unit,
   wherein the processor is configured to:
      configure a subframe for respectively transmitting a plurality of types of periodic channel state information (C SI) including a first CSI and a second CSI,
      wherein the first CSI is a rank indicator (RI) indicating the number of layers recommended by the UE, and the second CSI is a CSI which is different from the RI; and
   transmit the plurality of types of periodic CSI via a data channel of the subframe,
   wherein the first CSI and the second CSI are transmitted by multiplexing in the subframe,
   wherein an acknowledgement/not-acknowledgement (ACK/NACK) is transmitted by being piggybacked on the data channel when it fails to receive a specific field indicating a resource for transmitting the ACK/NACK in a downlink grant for scheduling a data unit.

* * * * *